US012591669B2

(12) United States Patent
Kato et al.

(10) Patent No.: US 12,591,669 B2
(45) Date of Patent: Mar. 31, 2026

(54) MALWARE DETECTION METHOD, MALWARE DETECTION DEVICE, AND RECORDING MEDIUM

(71) Applicant: Panasonic Intellectual Property Corporation of America, Torrance, CA (US)

(72) Inventors: Ryo Kato, Osaka (JP); Manabu Maeda, Osaka (JP); Tomoyuki Haga, Nara (JP); Naohisa Nishida, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 138 days.

(21) Appl. No.: 18/394,174

(22) Filed: Dec. 22, 2023

(65) Prior Publication Data

US 2024/0126877 A1     Apr. 18, 2024

Related U.S. Application Data

(63) Continuation of application No. PCT/JP2022/026374, filed on Jun. 30, 2022.

(30) Foreign Application Priority Data

Jul. 8, 2021     (JP) ................................. 2021-113810

(51) Int. Cl.
| | |
|---|---|
| *G06F 21/56* | (2013.01) |
| *G06F 11/30* | (2006.01) |
| *G06F 21/55* | (2013.01) |

(52) U.S. Cl.
CPC .......... *G06F 21/56* (2013.01); *G06F 11/3062* (2013.01); *G06F 21/552* (2013.01); *G06F 21/562* (2013.01); *G06F 21/566* (2013.01)

(58) Field of Classification Search
CPC ...... G06F 21/56; G06F 21/552; G06F 21/562; G06F 21/566; G06F 11/3062; H04L 67/12
See application file for complete search history.

(56) References Cited

U.S. PATENT DOCUMENTS

| | | | |
|---|---|---|---|
| 9,268,938 B1 | 2/2016 | Gonzalez et al. | |
| 9,860,257 B1 * | 1/2018 | Kumar ................ | G06F 11/3006 |

(Continued)

FOREIGN PATENT DOCUMENTS

| | | |
|---|---|---|
| JP | 6709845 | 6/2020 |
| WO | 2016/190931 | 12/2016 |

OTHER PUBLICATIONS

T. D. Nguyen, S. Marchal, M. Miettinen, H. Fereidooni, N. Asokan and A.-R. Sadeghi, "DÏoT: A Federated Self-learning Anomaly Detection System for IoT," 2019 IEEE 39th International Conference on Distributed Computing Systems (ICDCS), Dallas, TX, USA, 2019, pp. 756-767, doi: 10.1109/ICDCS.2019.00080. (Year: 2019).*

(Continued)

*Primary Examiner* — Robert B Leung
(74) *Attorney, Agent, or Firm* — GREENBLUM & BERNSTEIN, P.L.C.

(57)     ABSTRACT

A malware detection method for a home network system including one or more home appliances that are connected to a home network includes: obtaining a plurality of setting values including at least information indicating a device type and an operating state of a target device subject to malware detection; selecting one detection model out of a plurality of detection models according to the plurality of setting values obtained; obtaining power consumption or current consumption of the target device; and detecting whether the target device is infected with malware, using the one detection (Continued)

model selected in the selecting and based on the power consumption or the current consumption obtained.

11 Claims, 29 Drawing Sheets

(56) References Cited

U.S. PATENT DOCUMENTS

| | | | |
|---|---|---|---|
| 2008/0276111 A1* | 11/2008 | Jacoby | G06F 11/3062 |
| | | | 713/340 |
| 2010/0313270 A1* | 12/2010 | Kim | H04W 52/0264 |
| | | | 726/24 |
| 2014/0237283 A1* | 8/2014 | Bayang | G06F 11/3062 |
| | | | 713/340 |
| 2015/0177765 A1* | 6/2015 | Nakajima | H04N 21/43615 |
| | | | 700/297 |
| 2016/0091540 A1* | 3/2016 | Marti | G01R 21/1333 |
| | | | 702/62 |
| 2018/0330091 A1* | 11/2018 | Prowell | G06F 21/552 |
| 2019/0205234 A1 | 7/2019 | Moriyama et al. | |
| 2019/0361058 A1* | 11/2019 | Amarnath | G01D 21/00 |
| 2020/0169890 A1* | 5/2020 | Kaushik | H04W 12/12 |

OTHER PUBLICATIONS

M. Yamauchi, Y. Ohsita, M. Murata, K. Ueda and Y. Kato, "Anomaly Detection in Smart Home Operation From User Behaviors and Home Conditions," in IEEE Transactions on Consumer Electronics, vol. 66, No. 2, pp. 183-192, May 2020, doi: 10.1109/TCE.2020. 2981636. (Year: 2020).*

R. Bridges, J. Hernández Jiménez, J. Nichols, K. Goseva-Popstojanova and S. Prowell, "Towards Malware Detection via CPU Power Consumption: Data Collection Design and Analytics," 2018 17th IEEE International Conference On Trust, Security And Privacy In Computing And Communications, 2018, pp. 1680-1684. (Year: 2018).*

M. Dilraj, K. Nimmy and S. Sankaran, "Towards Behavioral Profiling Based Anomaly Detection for Smart Homes," TENCON 2019—2019 IEEE Region 10 Conference (TENCON), Kochi, India, 2019, pp. 1258-1263. (Year: 2019).*

Extended European Search Report for European Pat. App. No. 22837608.3, mailed on Sep. 17, 2024.

International Search Report issued in International Pat. Appl. No. PCT/JP2022/026374, dated Aug. 23, 2022, along with an English language translation thereof.

* cited by examiner

FIG. 3

| No. | Device type | Model number | Operating state | Detection model |
|---|---|---|---|---|
| 1 | Air conditioner | AB-XB-1 | ON | Detection model list 1 |
| 2 | Air conditioner | AB-XB-1 | OFF | Detection model list 2 |

FIG. 6

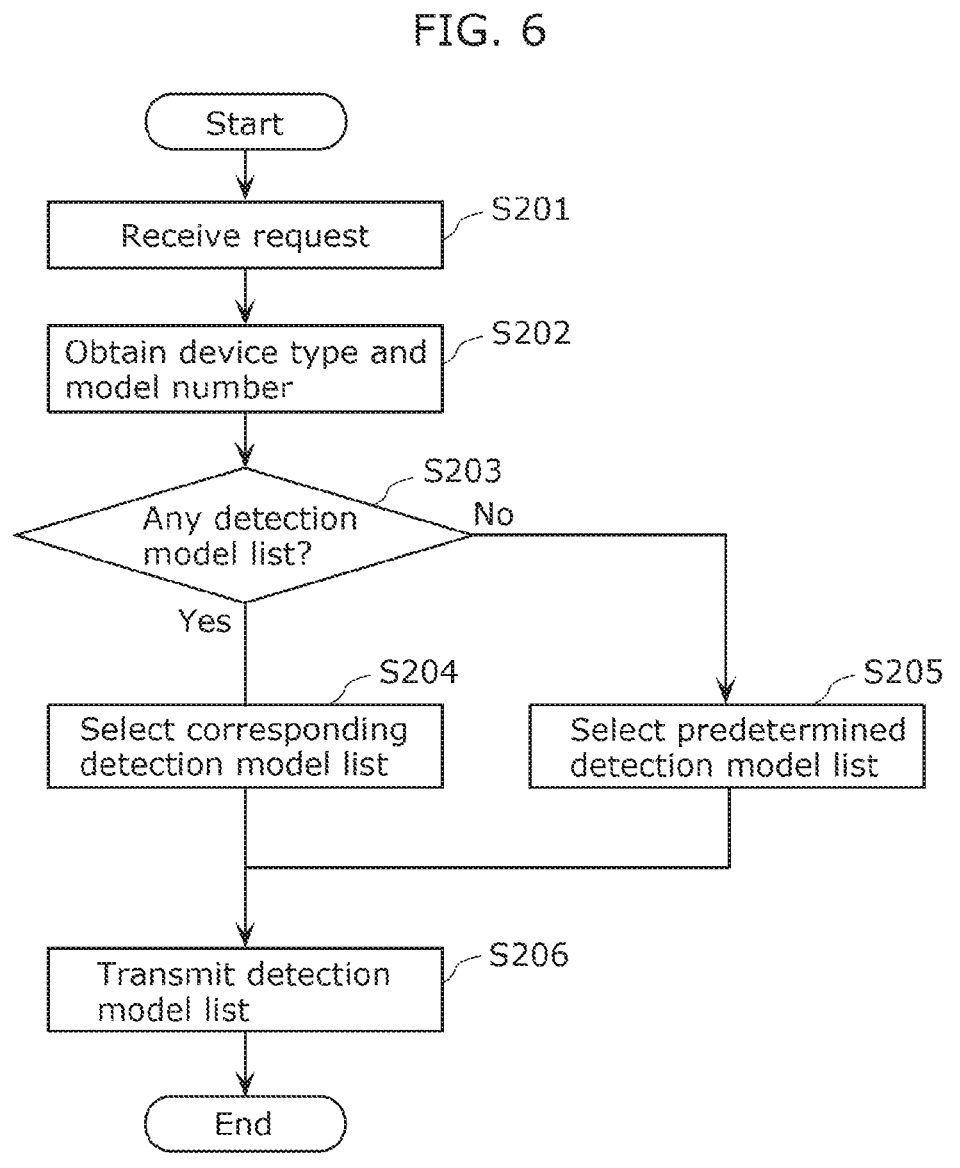

```
                    ┌──────────┐
                    │  Start   │
                    └────┬─────┘
                         │
          ┌──────────────▼──────────────┐  ╭─ S201
          │      Receive request        │
          └──────────────┬──────────────┘
                         │
          ┌──────────────▼──────────────┐  ╭─ S202
          │  Obtain device type and     │
          │  model number               │
          └──────────────┬──────────────┘
                         │
                  ╱──────▼──────╲          S203
                 ╱ Any detection  ╲      No
                ◄  model list?     ►──────────────┐
                 ╲                ╱                │
                  ╲──────┬──────╱                  │
                    Yes  │                         │
          ┌──────────────▼──────────────┐  ╭─ S204 │  ┌─────────────────────────┐  ╭─ S205
          │  Select corresponding       │         └─►│  Select predetermined   │
          │  detection model list       │            │  detection model list   │
          └──────────────┬──────────────┘            └───────────┬─────────────┘
                         │                                       │
                         └───────────────┬───────────────────────┘
                                         │
                    ┌────────────────────▼─────┐  ╭─ S206
                    │  Transmit detection       │
                    │  model list               │
                    └────────────────────┬─────┘
                                         │
                                    ┌────▼─────┐
                                    │   End    │
                                    └──────────┘
```

FIG. 9

| SEOJ | DEOJ | ESV | OPC | EPC1 | PDC1 | EDT1 | EPC2 | PDC2 | EDT2 | EPC3 | PDC3 | EDT3 |
|------|------|-----|-----|------|------|------|------|------|------|------|------|------|
| 0x30 | 0x·· | 0x72 | 0x·· | 0x80 | 0x·· | 0x30 | 0x8D | 0x·· | 0x·· | 0x8A | 0x·· | 0x·· |

Air conditioner class — Read response

Operating state (Identifier)

Serial number (Identifier)

Manufacturer code (Identifier)

ON (Identifier)

| No. | IP address | Device type | Model number | Operating state |
|-----|------------|-------------|--------------|-----------------|
| 1 | xx.xx.xx.xx | Air conditioner | AB-XB-1 | ON |

FIG. 11

| No. | Device type | Model number | Operating state | Detection model |
|-----|-------------|--------------|-----------------|-----------------|
| 1 | Air conditioner | AB-XB-1 | ON | Detection model list 1 |
| 2 | Air conditioner | AB-XB-1 | OFF | Detection model list 2 |

FIG. 17

| No. | IP address | Device type | Model number | Operating state | Mode | Power saving setting | Fan speed setting | Thermostat setting | Compressor setting |
|-----|------------|-------------|--------------|-----------------|------|----------------------|-------------------|--------------------|--------------------|
| 1 | xx.xx.xx.xx | Air conditioner | AB-XB-1 | ON | Heating | ON | 3 | ON | ON |

FIG. 18

| No. | Device type | Model number | Operating state | Mode | Power saving setting | Fan speed setting | Thermostat setting | Compressor setting | Detection model |
|---|---|---|---|---|---|---|---|---|---|
| 1 | Air conditioner | AB-XB-1 | ON | Heating | ON | 1 | ON | ON | Detection model 1 |
| 2 | Air conditioner | AB-XB-1 | ON | Heating | ON | 1 | ON | OFF | Detection model 2 |
| 3 | Air conditioner | AB-XB-1 | ON | Heating | ON | 1 | OFF | ON | Detection model 3 |
| 4 | Air conditioner | AB-XB-1 | OFF | Undefined | Undefined | Undefined | Undefined | Undefined | Detection model 4 |

80a

Power

Prediction line

Actual measurement

Time

Status: Infected with malware

User ID: 1234

Contact: user@example.com

IP: 192.168.1.2

MAC: 00:11:22:44:55:33

Type: Air conditioner

FIG. 26

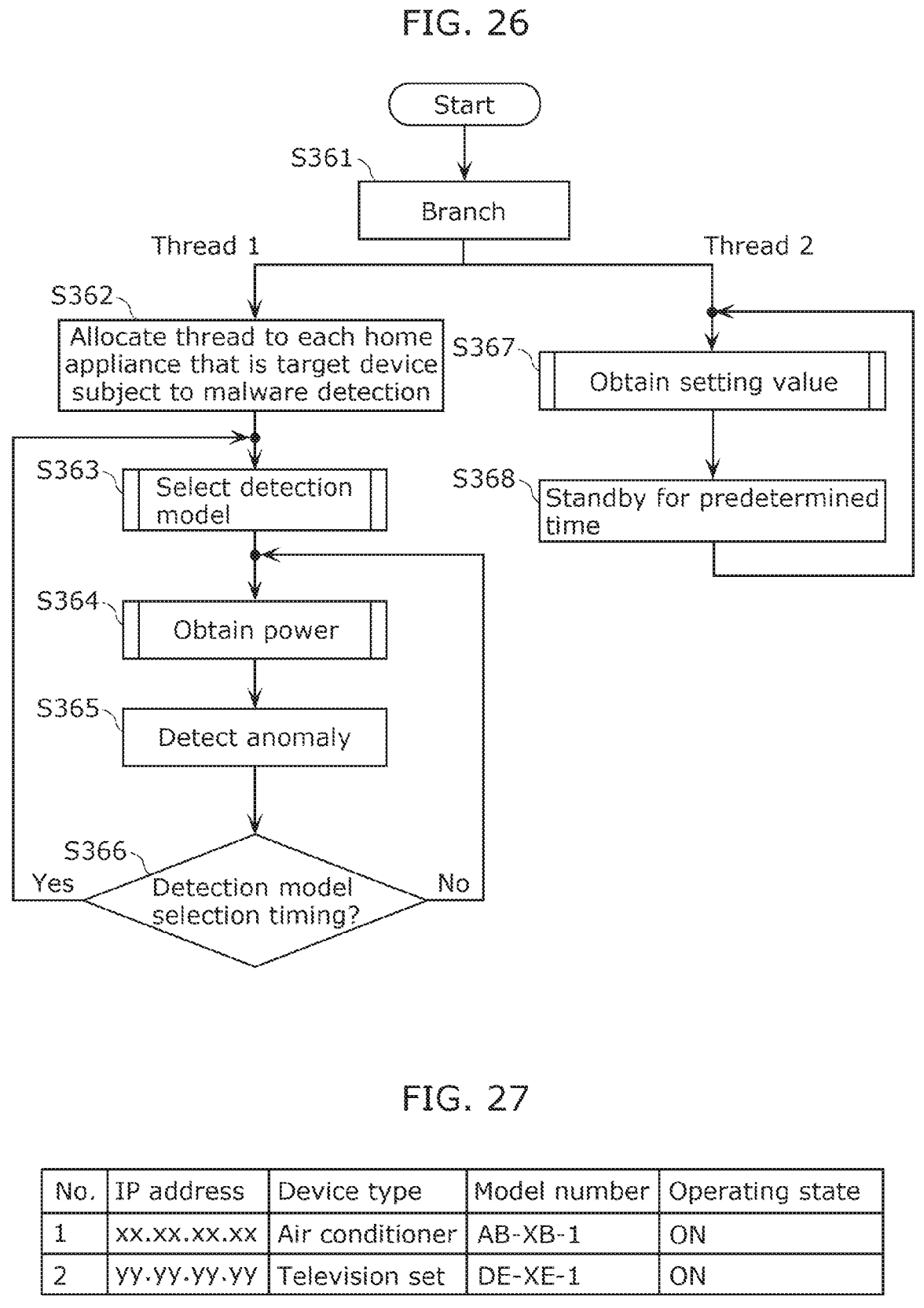

Start

S361 — Branch

Thread 1                    Thread 2

S362 — Allocate thread to each home appliance that is target device subject to malware detection S367 — Obtain setting value S363 — Select detection model S368 — Standby for predetermined time S364 — Obtain power S365 — Detect anomaly S366 — Detection model selection timing?
Yes                  No

FIG. 27

| No. | IP address | Device type | Model number | Operating state |
|-----|-----------|-------------|--------------|-----------------|
| 1 | xx.xx.xx.xx | Air conditioner | AB-XB-1 | ON |
| 2 | yy.yy.yy.yy | Television set | DE-XE-1 | ON |

FIG. 28

| No. | IP address | Device type | Model number | Operating state | Mode | Power saving setting | Fan speed setting | Thermostat setting | Compressor setting |
|-----|-----------|-------------|--------------|-----------------|------|----------------------|-------------------|--------------------|--------------------|
| 1 | xx.xx.xx.xx | Air conditioner | AB-XB-1 | ON | Heating | ON | 3 | ON | ON |
| 2 | yy.yy.yy.yy | Television set | DE-XE-1 | ON | Undefined | Undefined | Undefined | Undefined | Undefined |

FIG. 29

| No. | Device type | Model number | Operating state | Detection model |
|---|---|---|---|---|
| 1 | Air conditioner | AB-XB-1 | ON | Detection model 1 |
| 2 | Air conditioner | AB-XB-1 | OFF | Detection model 2 |
| 3 | Television set | DE-XE-1 | ON | Detection model 3 |
| 4 | Television set | DE-XE-1 | OFF | Detection model 4 |

FIG. 30

| No. | Device type | Model number | Operating state | Mode | Power saving setting | Fan speed setting | Thermostat setting | Compressor setting | Detection model |
|---|---|---|---|---|---|---|---|---|---|
| 1 | Air conditioner | AB-XB-1 | ON | Heating | ON | 1 | ON | ON | Detection model 5 |
| 2 | Air conditioner | AB-XB-1 | ON | Heating | ON | 1 | ON | OFF | Detection model 6 |
| 3 | Air conditioner | AB-XB-1 | ON | Heating | ON | 1 | OFF | ON | Detection model 7 |
| 4 | Air conditioner | AB-XB-1 | OFF | Undefined | Undefined | Undefined | Undefined | Undefined | Detection model 2 |
| 5 | TV set | DE-XE-1 | ON | Undefined | Undefined | Undefined | Undefined | Undefined | Detection model 3 |
| 6 | TV set | DE-XE-1 | OFF | Undefined | Undefined | Undefined | Undefined | Undefined | Detection model 4 |

MALWARE DETECTION METHOD, MALWARE DETECTION DEVICE, AND RECORDING MEDIUM

CROSS REFERENCE TO RELATED APPLICATIONS

This is a continuation application of PCT International Application No. PCT/JP2022/026374 filed on Jun. 30, 2022, designating the United States of America, which is based on and claims priority of Japanese Patent Application No. 2021-113810 filed on Jul. 8, 2021. The entire disclosures of the above-identified applications, including the specifications, drawings and claims are incorporated herein by reference in their entirety.

FIELD

The present disclosure relates to a malware detection method, etc., performed in a home network limited to a predetermined space.

BACKGROUND

Recent years have seen more household home appliances that can be connected to local networks within buildings and connected to the Internet via routers or the like. Such home appliances can be controlled remotely via the Internet, the states of such home appliances can be monitored remotely via the Internet, and such home appliances can be coordinated with other home appliances located within buildings via the Internet, for example.

On the other hand, devices that can be connected to the Internet have an increased risk of being exposed to cyberattacks. For examples, terminal equipment such as routers, personal computers, and smartphones may be infected with malware, for example, due to cyberattacks and forced to participate in attacks on other servers on the Internet.

The malware is a program that resides in the infected terminal equipment and continuously consumes electric power. Note that among malware products, malware such as coin miners that perform fraudulent mining of cryptocurrencies with infected terminals consumes a significant amount of electric power in order to mine cryptocurrencies and therefore, signs of malware infection are likely to appear in power values at the terminal equipment.

In view of this, a malware detection method is known in which whether terminal equipment is infected with malware is detected using a difference in power consumption or a difference in an electric current that occurs in terminal equipment infected with malware (for example, Patent Literature (PTL) 1). According to PTL 1, whether terminal equipment is infected with malware can be determined by performing machine learning in advance using normal power consumption of the terminal as normal data and comparing actual power consumption of the terminal equipment to the normal power consumption.

CITATION LIST

Patent Literature

PTL 1: Japanese Patent No. 6709845

SUMMARY

Technical Problem

There are cases where routers, personal computers, or smartphones which are terminal equipment that can be connected to the Internet are infected with malware; therefore, there is a risk that home appliances that can be connected to the Internet may likewise be infected with malware.

Therefore, a malware detection method for home appliances is required. Furthermore, since there are generally not many resources for home appliances, it is sufficient that the malware detection method for home appliances be a malware detection method in which whether a home appliance is infected with malware is detected using power consumption of the home appliance. For example, normal power consumption of a home appliance is estimated, and when there is a significant difference between the estimated normal power consumption and actual power consumption, it can be determined that the home appliance is infected with malware.

However, for example, when the home appliance is an air conditioner (AC), the normal power consumption of the air conditioner cannot be estimated in a uniform manner, but can be estimated in a comprehensive manner from a large number of external factors and internal states. Examples of the large number of external factors and internal states include whether the current operating state of the air conditioner is heating or cooling, whether the power saving setting of the air conditioner is ON, how different the indoor temperature and the target temperature of the air conditioner are, and whether the compressor in the air conditioner is operating.

Furthermore, the power consumption varies greatly among air conditioners manufactured by different manufacturers or among different models of air conditioners. This means that information of manufacturers or models are required to estimate the normal power consumption of an air conditioner.

Furthermore, for example, when two air conditioners that are a target air conditioner subject to malware detection and another air conditioner different from the target air conditioner are operating in the same room, the power consumption will be different from that measured when only the target air conditioner is operating. For example, when two air conditioners located in the same room are used to heat or cool the room, the power consumption per air conditioner is less than the power consumption measured when only one air conditioner is used to heat or cool the room. This means that information of an environment in which the air conditioner is installed is further required to estimate the normal power consumption of the air conditioner.

Therefore, in order to accurately estimate the normal power consumption of an air conditioner, it is necessary to dynamically obtain information about the air conditioner and information of the settings of the air conditioner or an environment in which the air conditioner is installed, for example, in addition to a power consumption history and indoor temperature sensor values.

Specifically, the malware detection method disclosed in PTL 1 mentioned above is problematic in that because power consumption is estimated without using information about home appliances such as air conditioners or the settings of the home appliances, the accuracy of detecting malware in the home appliances is not high.

The present disclosure is conceived in view of the above-described circumstances and has an object to provide a malware detection method, etc., in which malware in a home appliance can be detected with improved accuracy.

Solution to Problem

In order to achieve the aforementioned object, a malware detection method according to one aspect of the present disclosure is a malware detection method for a home network system including one or more home appliances that are connected to a home network and that include a target device subject to malware detection. The malware detection method includes: obtaining a plurality of setting values including at least information indicating a device type and an operating state of the target device; selecting one detection model out of a plurality of detection models according to the plurality of setting values obtained in the obtaining of the plurality of setting values; obtaining power consumption or current consumption of the target device; detecting whether the target device is infected with malware, based on the power consumption or the current consumption obtained in the obtaining of the power consumption or the current consumption using the one detection model selected in the selecting; and outputting a value indicating whether the target device is infected with malware, the value being obtained by inputting the power consumption or the current consumption to the one detection model.

Advantageous Effects

According to the present disclosure, it is possible to improve the accuracy of detecting malware in a home appliance.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 3 is a flowchart illustrating one example of the processing performed by a home appliance according to Embodiment 1.

FIG. 6 is a flowchart illustrating one example of the processing performed by a server according to Embodiment 1.

FIG. 9 is a diagram illustrating one example of an ECHONET Lite frame for returning a setting value of a home appliance according to Embodiment 1.

FIG. 10 is a diagram illustrating one example of a setting list according to Embodiment 1.

FIG. 11 is a diagram illustrating one example of a detection model list held by a detection model list holder according to Embodiment 1.

FIG. 17 is a diagram illustrating one example of a setting list according to Embodiment 2.

FIG. 18 is a diagram illustrating one example of a plurality of detection models included in a detection model list held by a detection model list holder according to Embodiment 2.

FIG. 26 is a flowchart illustrating one example of a main process performed by an anomaly detection device according to Variation 3.

FIG. 27 is a diagram illustrating one example of a setting list held by a setting list holder according to Variation 3.

FIG. 28 is a diagram illustrating another example of a setting list held by a setting list holder according to Variation 3.

FIG. 29 is a diagram illustrating one example of a plurality of detection models included in a detection model list held by a detection model list holder according to Variation 3.

FIG. 30 is a diagram illustrating another example of a plurality of detection models included in a detection model list held by a detection model list holder according to Variation 3.

DESCRIPTION OF EMBODIMENTS

Figure 1:
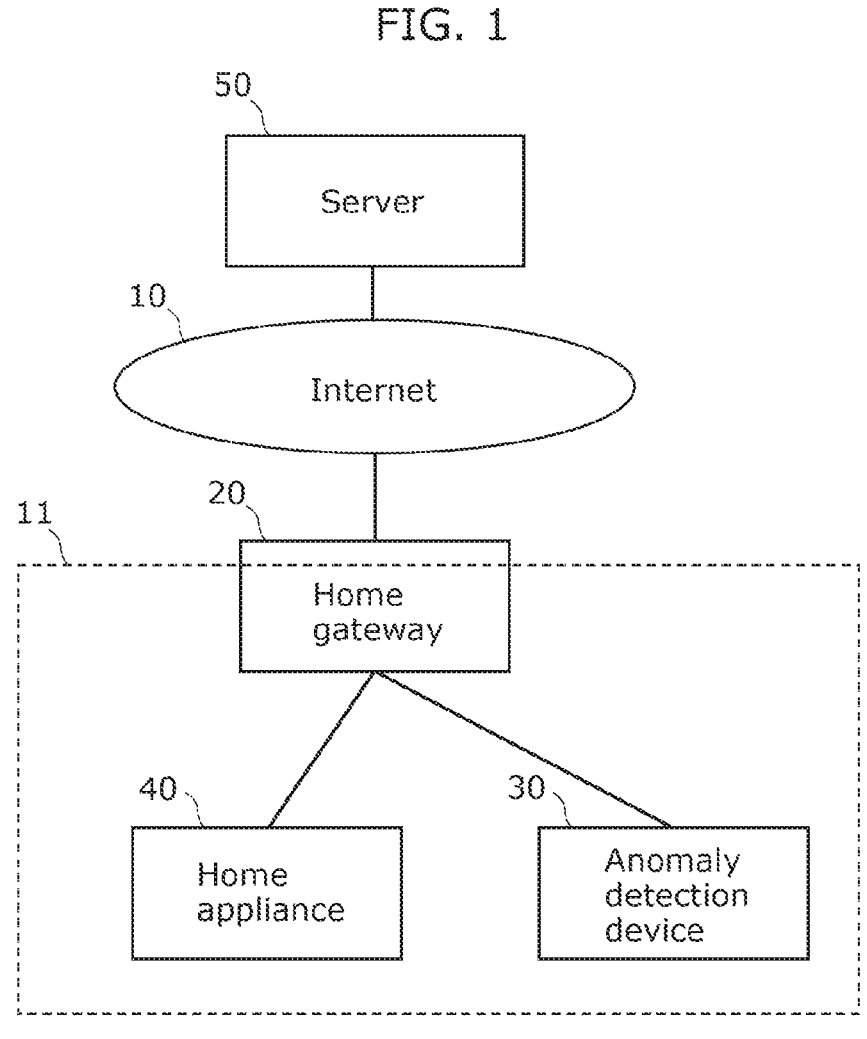
FIG. 1 is a diagram illustrating the overall configuration of a malware detection system according to Embodiment 1.

Hereinafter, malware detection methods, etc., according to exemplary embodiments of the present disclosure will be described with reference to the drawings. Note that each of the exemplary embodiments described below shows one specific preferred example of the present disclosure. In other words, the numerical values, shapes, materials, structural elements, the arrangement and connection of the structural elements, steps, the processing order of the steps etc., shown in the following exemplary embodiments are mere examples of the present disclosure, and are not intended to limit the present disclosure. The present disclosure is defined based on the recitations of the Claims. Therefore, among the structural elements in the following exemplary embodiments, structural elements not recited in any one of the independent claims of the present disclosure are not necessarily required to achieve the object of the present disclosure, but are described as structural elements of a more preferred exemplary embodiment.

Embodiment 1

A malware detection method according to one aspect of the present disclosure is a malware detection method for a home network system including one or more home appliances that are connected to a home network and that include a target device subject to malware detection. The malware detection method includes: obtaining a plurality of setting values including at least information indicating a device type and an operating state of the target device; selecting one detection model out of a plurality of detection models according to the plurality of setting values obtained in the obtaining of the plurality of setting values; obtaining power consumption or current consumption of the target device; detecting whether the target device is infected with malware, based on the power consumption or the current consumption obtained in the obtaining of the power consumption or the current consumption using the one detection model selected in the selecting; and outputting a value indicating whether the target device is infected with malware, the value being obtained by inputting the power consumption or the current consumption to the one detection model.

In this manner, one detection model suitable for a home appliance having a variable power value or a variable electric current value can be selected according to a plurality of setting values that have been set on a home appliance that is a target device subject to malware detection. This enables more accurate detection of malware in a home appliance that is a target device subject to malware detection from the power value or the electric current value of the home appliance that is the target device using one detection model.

In other words, it is possible to improve the accuracy of detecting malware in a home appliance.

Here, for example, the operating state may indicate whether the target device is in an operating state or a stopped state.

Furthermore, for example, when the target device is an air conditioner, the plurality of setting values obtained in the obtaining of the plurality of setting values may further include information indicating whether the target device is operating in a heating mode or a cooling mode.

Furthermore, for example, when the target device is an air conditioner, the plurality of setting values obtained in the obtaining of the plurality of setting values may further include at least one of: information indicating whether the target device is in a defrosting state; information indicating whether the target device is in a residual heat state; information indicating whether the target device is in a heat removal state; information indicating whether a compressor of the target device is operating; or information indicating whether a thermostat of the target device is operating.

Furthermore, for example, when the target device is an air conditioner, the plurality of setting values obtained in the obtaining of the plurality of setting values may further include at least one of: information indicating a fan speed of the target device; or information indicating whether a power saving setting of the target device is ON.

Furthermore, for example, in the obtaining of the plurality of setting values, the plurality of setting values may be obtained using a home appliance operating protocol, and in the obtaining of the power consumption or the current consumption, the power consumption or the current consumption of the target device may be obtained using the home appliance operating protocol.

Furthermore, for example, the home appliance operating protocol may be ECHONET Lite.

Furthermore, for example, the selecting may include: obtaining, from a server, a detection model list including the plurality of detection models corresponding to indoor information; and selecting the one detection model out of the detection model list according to the plurality of setting values obtained in the obtaining of the plurality of setting values.

Furthermore, for example, when the target device is an air conditioner, the indoor information may be information indicating whether one or more air conditioners other than the target device are present in a space where the target device is installed.

Furthermore, for example, when the target device is an air conditioner, the indoor information may be information indicating whether a space where the target device is installed includes a thermal insulation structure.

A malware detection device according to one aspect of the present disclosure is a malware detection device for a home network system including one or more home appliances that are connected to a home network and that include a target device subject to malware detection. The malware detection device includes: a setting value obtainer that obtains a plurality of setting values including at least information indicating a device type and an operating state of the target device; a detection model selector that selects one detection model out of a plurality of detection models according to the plurality of setting values obtained by the setting value obtainer; a power consumption obtainer that obtains power consumption or current consumption of the target device; an anomaly detector that detects whether the target device is infected with malware, based on the power consumption or the current consumption obtained by the power consumption obtainer using the one detection model selected by the detection model selector; and an outputter that outputs a value indicating whether the target device is infected with malware, the value being obtained by inputting the power consumption or the current consumption to the one detection model.

Furthermore, a recording medium according to one aspect of the present disclosure is a non-transitory computer-readable recording medium having recorded thereon a program for performing a malware detection method for a home network system including one or more home appliances that are connected to a home network and that include a target device subject to malware detection. The program is used for executing: obtaining a plurality of setting values including at least information indicating a device type and an operating state of the target device; selecting one detection model out of a plurality of detection models according to the plurality of setting values obtained in the obtaining of the plurality of setting values; obtaining power consumption or current consumption of the target device; detecting whether the target device is infected with malware, based on the power consumption or the current consumption obtained in the obtaining of the power consumption or the current consumption using the one detection model selected in the selecting; and outputting a value indicating whether the target device is infected with malware, the value being obtained by inputting the power consumption or the current consumption to the one detection model.

Note that these general and specific aspects may be implemented using a system, a device, a method, an integrated circuit, a computer program, or a computer-readable recording medium such as a compact disc read-only memory (CD-ROM), or any combination of systems, devices, methods, integrated circuits, computer programs, and recording media.

[1. Configuration of System]

A malware detection method will be described below with reference to the drawings. Note that the present exemplary embodiment describes, as an example, a case where an anomaly detection device and a home appliance that is a target device subject to malware detection (hereinafter referred to as a home appliance) are connected to an intra-household network (home network 11).

[1.1 Overall Configuration of Malware Detection System for Home Appliances]

FIG. 1 is a diagram illustrating the overall configuration of a malware detection system according to Embodiment 1. A malware detection system according to the present disclosure is a home network system including one or more home appliances that are connected to a home network and include a target device subject to malware detection. The malware detection system illustrated in FIG. 1 includes Internet 10, home network 11, home gateway 20, anomaly detection device 30, home appliance 40, and server 50.

Internet 10 is a commonly used Internet.

Home network 11 is a commonly used home network and uses a home appliance operating protocol. Examples of the home appliance operating protocol include, but are not limited to, ECHONET Lite. The home appliance operating protocol may be Nest, HomeKit (registered trademark), or Matter.

Home gateway 20, anomaly detection device 30, and home appliance 40 are connected via home network 11, as illustrated in FIG. 1. For example, the communication between anomaly detection device 30 or home appliance 40 and server 50 or the communication between anomaly detection device 30 and home appliance 40 is communication via home gateway 20.

Home gateway 20 acts as an intermediary for the communication between anomaly detection device 30 and home appliance 40 and the communication between anomaly detection device 30 or home appliance 40 and Internet 10. Home gateway 20 manages information such as IP addresses required for anomaly detection device 30 and home appliance 40 to perform communication. Home gateway 20 allocates an IP address in response to a request from each device or provides information required for communication.

Home appliance 40 is a household appliance that is connected to home network 11 and is in compliance with the home appliance operating protocol. Examples of home appliance 40 include, but are not limited to, an air conditioner. Home appliance 40 may be a refrigerator, a washing machine, a robotic vacuum cleaner, a smart speaker, or the like.

When anomaly detection device 30 uses the home appliance operating protocol and requests home appliance 40 to provide a setting value, home appliance 40 transmits (responds) a setting value of home appliance 40 at the time of the request to anomaly detection device 30 using the home appliance operating protocol. Furthermore, when anomaly detection device 30 uses the home appliance operating protocol and requests home appliance 40 to provide a power value or an electric current value, home appliance 40 transmits (responds) a power value or an electric current value of home appliance 40 at the time of the request to anomaly detection device 30 using the home appliance operating protocol.

Server 50 is connected to Internet 10. In response to a request from anomaly detection device 30, server 50 transmits a detection model list including a plurality of detection models to be used by anomaly detection device 30 during anomaly detection.

Anomaly detection device 30 is connected to home network 11. Anomaly detection device 30 obtains the setting values and the power value (or the electric current value) of home appliance 40 using the home appliance operating protocol. Anomaly detection device 30 may communicate with server 50 as necessary and obtain information for detecting an anomaly in home appliance 40.

Furthermore, anomaly detection device 30 selects a detection model corresponding to the setting values and the power value of home appliance 40 that have been obtained, and detects, using the selected detection model on the basis of the power value or the electric current value of home appliance 40, whether home appliance 40 is infected with malware.

Hereinafter, home appliance 40 will be described in detail.

[1.1.1 Details of Home Appliance 40]

Figure 2:
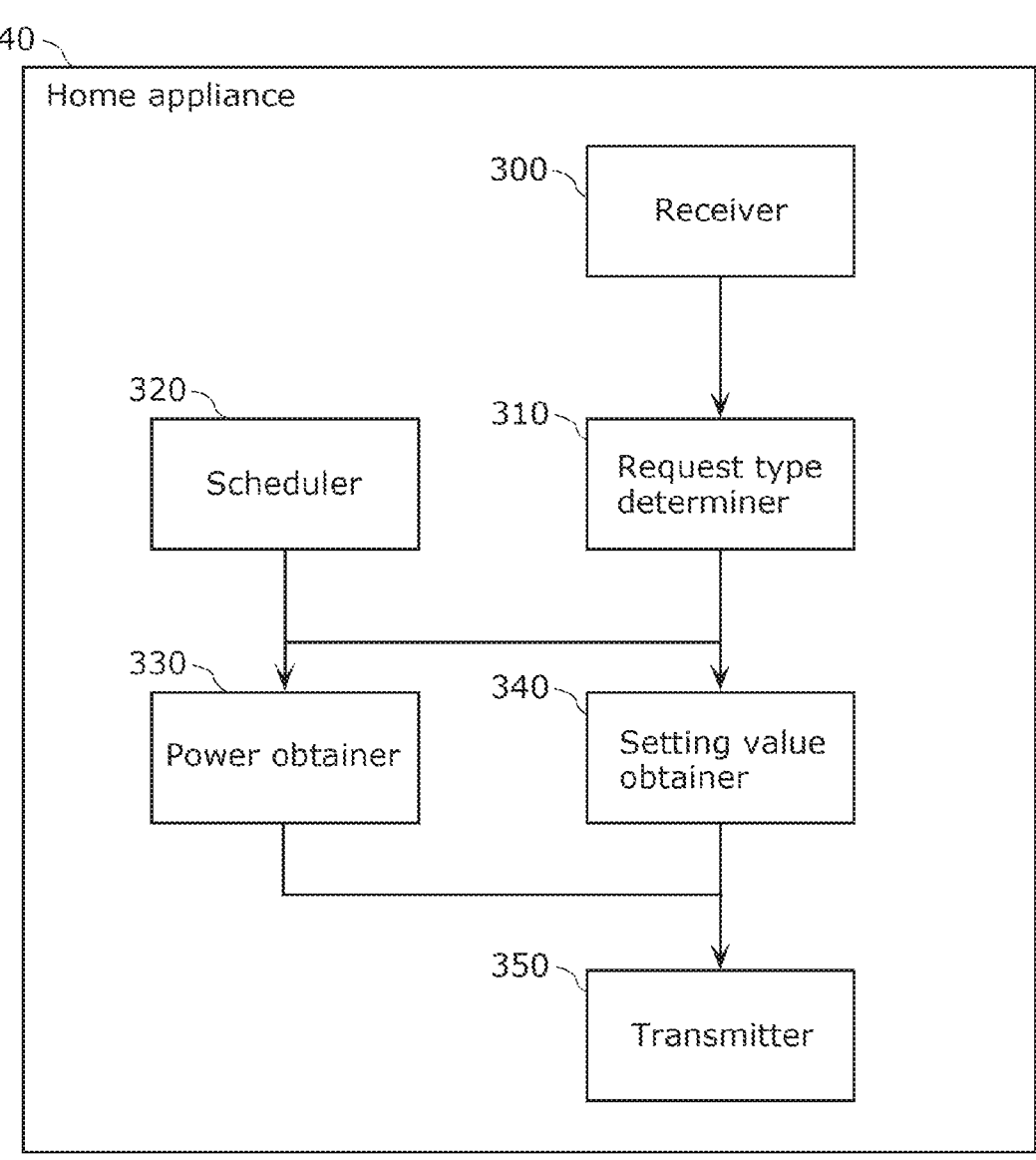
FIG. 2 is a diagram illustrating the configuration of a home appliance according to Embodiment 1.

FIG. 2 is a diagram illustrating the configuration of home appliance 40 according to Embodiment 1.

As illustrated in FIG. 2, home appliance 40 includes receiver 300, request type determiner 310, scheduler 320, power obtainer 330, setting value obtainer 340, and transmitter 350.

Receiver 300 receives a request for a setting value or a power value (or an electric current value) using the home appliance operating protocol. In the present exemplary embodiment, receiver 300 receives a request packet compliant with the home appliance operating protocol.

Request type determiner 310 determines the type of the request packet received by receiver 300. In the present exemplary embodiment, the request packet is classified into two types, i.e., a power request for requesting the power value and a setting value request for requesting the setting value.

Scheduler 320 controls the timings at which the power value and the setting value are obtained. When determining that this is an appropriate timing for transmission of the power value, scheduler 320 issues a power obtainment event, and when determining that this is an appropriate timing for transmission of the setting value, scheduler 320 issues a setting value obtainment event.

Here, the appropriate timing for transmission of the power value may be the timing at which a predetermined length of time has elapsed after the timing at which the last power value transmitted is obtained or may be the timing at which the change in the power value relative to the last power value transmitted reaches or exceeds a predetermined threshold value, for example. The appropriate timing for transmission of the setting value may be the timing at which at least one setting value among the plurality of setting values is changed or may be the timing at which a predetermined length of time has elapsed after the timing at which the last setting value transmitted is obtained, for example. Furthermore, when the setting value is a continuous value such as a room temperature, the appropriate timing for transmission of the setting value may be the timing at which the change in the setting value relative to the last setting value transmitted reaches or exceeds a predetermined threshold value.

Note that scheduler 320 may issue the power obtainment event or the setting value obtainment event at predetermined time intervals. Furthermore, scheduler 320 may issue the power obtainment event every time the power value is updated or may issue the setting value obtainment event every time the setting value is updated.

Power obtainer 330, which is one example of the power consumption obtainer, obtains the power value of home appliance 40 when the power obtainment event is issued or when the request packet is a power request. In the present exemplary embodiment, power obtainer 330 obtains the power consumption value of home appliance 40.

Setting value obtainer 340 obtains the setting value of home appliance 40 when the setting value obtainment event is issued or when the request packet is a setting value request. In the present exemplary embodiment, setting value obtainer 340 obtains a plurality of setting values including at least information indicating the device type and the operating state of home appliance 40. The information indicating the operating state indicates whether home appliance 40 is in an operating state indicating that it is operating or a stopped state indicating that it is not operating.

Transmitter 350 transmits the requested setting value or power value (or electric current value) using the home appliance operating protocol. In the present exemplary embodiment, when receiver 300 receives a request packet compliant with the home appliance operating protocol, transmitter 350 transmits, according to the request packet received by receiver 300, the power value obtained by power obtainer 330 and the setting value obtained by setting value obtainer 340. More specifically, using the home appliance operating protocol, transmitter 350 transmits the power value obtained by power obtainer 330 or the setting value obtained by setting value obtainer 340 to the source IP address of the request packet.

Note that when the destination cannot be identified, transmitter 350 may transmit the power value or the setting value in a multicast or broadcast fashion using the home appliance operating protocol.

Next, the processing by home appliance 40 will be described.

Figure 3:
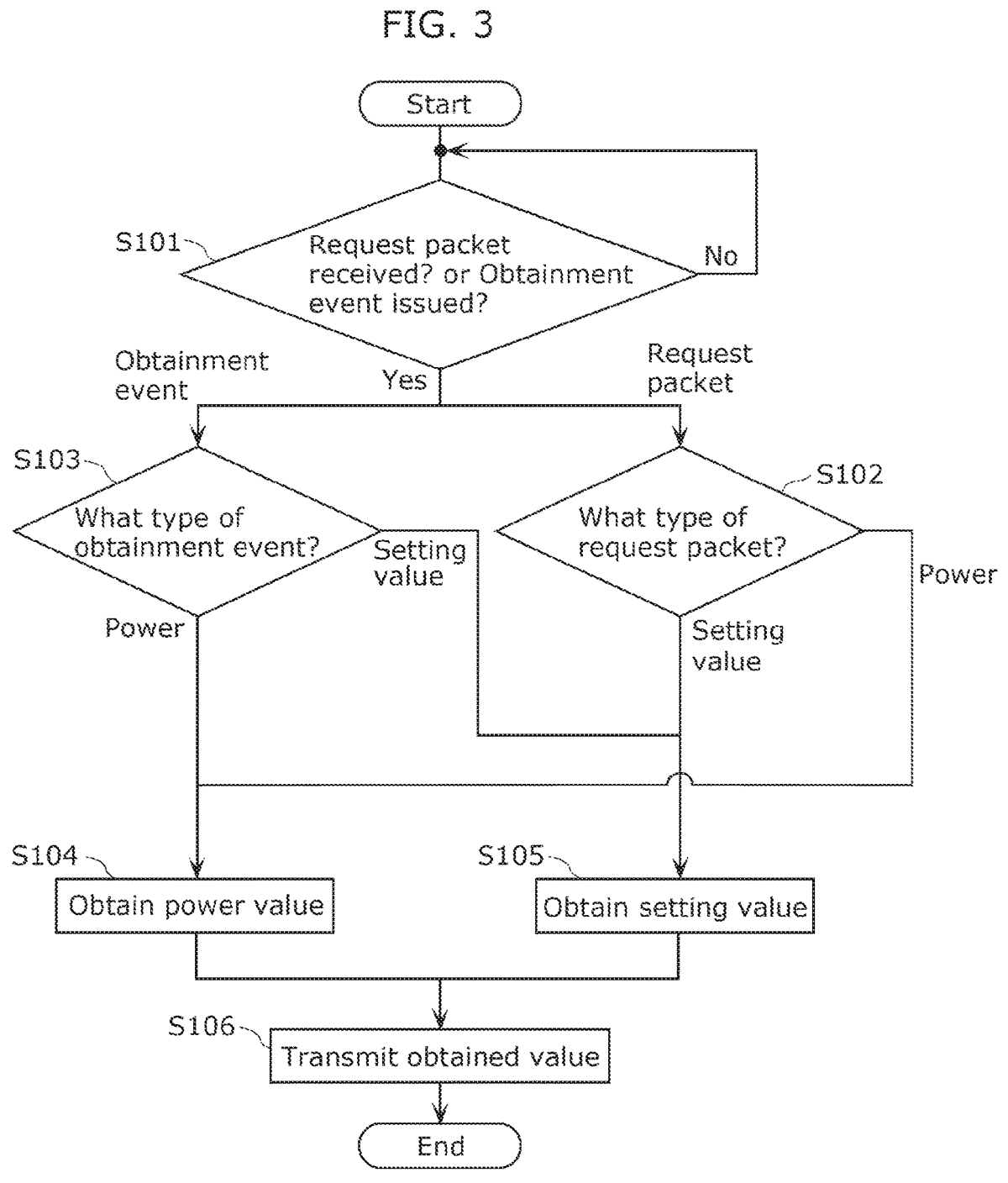

FIG. 3 is a flowchart illustrating one example of the processing performed by home appliance 40 according to Embodiment 1.

Home appliance 40 remains on standby until a request packet is received or until an obtainment event is issued (S101). More specifically, home appliance 40 remains on standby until receiver 300 receives a request packet or until scheduler 320 issues an obtainment event.

When a request packet is received in S101 (the case of a request packet when the result is Yes in S101), home appliance 40 determines the type of the request packet (S102). More specifically, in home appliance 40, when receiver 300 receives a request packet, request type determiner 310 determines the type of the request packet.

When an obtainment event is issued in Step S101 (the case of an obtainment event when the result is Yes in S101), home appliance determines the type of the obtainment event (S103). More specifically, home appliance 40 determines the type of the obtainment event issued by scheduler 320. Note that according to the type of the obtainment event issued by scheduler 320, the obtainment event may be transmitted to power obtainer 330 or setting value obtainer 340. In this case, it is sufficient that the process in Step S103 be skipped.

When the type of the request packet is a power request in Step S102 (the case of power in S102), home appliance 40 obtains a power value (S104). More specifically, in home appliance 40, when the type of the request packet is a power request, power obtainer 330 obtains a power value.

When the type of the request packet is a setting value request in Step S102 (the case of a setting value in S102), home appliance obtains a setting value (S105). More specifically, in home appliance 40, when the type of the request packet is a setting value request, setting value obtainer 340 obtains a setting value.

When the type of the obtainment event is a power obtainment event in Step S103 (the case of power in S103), home appliance 40 obtains a power value (S104). More specifically, in home appliance 40, when the type of the obtainment event is a power obtainment event, power obtainer 330 obtains a power value.

When the type of the obtainment event is a setting value obtainment event in Step S103 (the case of a setting value in S103), home appliance 40 obtains a setting value (S105). More specifically, in home appliance 40, when the type of the obtainment event is a setting value event, setting value obtainer 340 obtains a setting value.

Next, home appliance 40 transmits the value obtained in Step S104 or Step S105 (S106).

Note that in one example of the processing performed by home appliance 40 that is indicated in FIG. 3, home appliance 40 is described as obtaining and transmitting a power value, but this is not limiting. Home appliance 40 may obtain and transmit an electric current value instead of a power value or may obtain and transmit both a power value and an electric current value.

Hereinafter, server 50 will be described in detail.

[1.1.2 Details of Server 50]

Figures 4, 5:
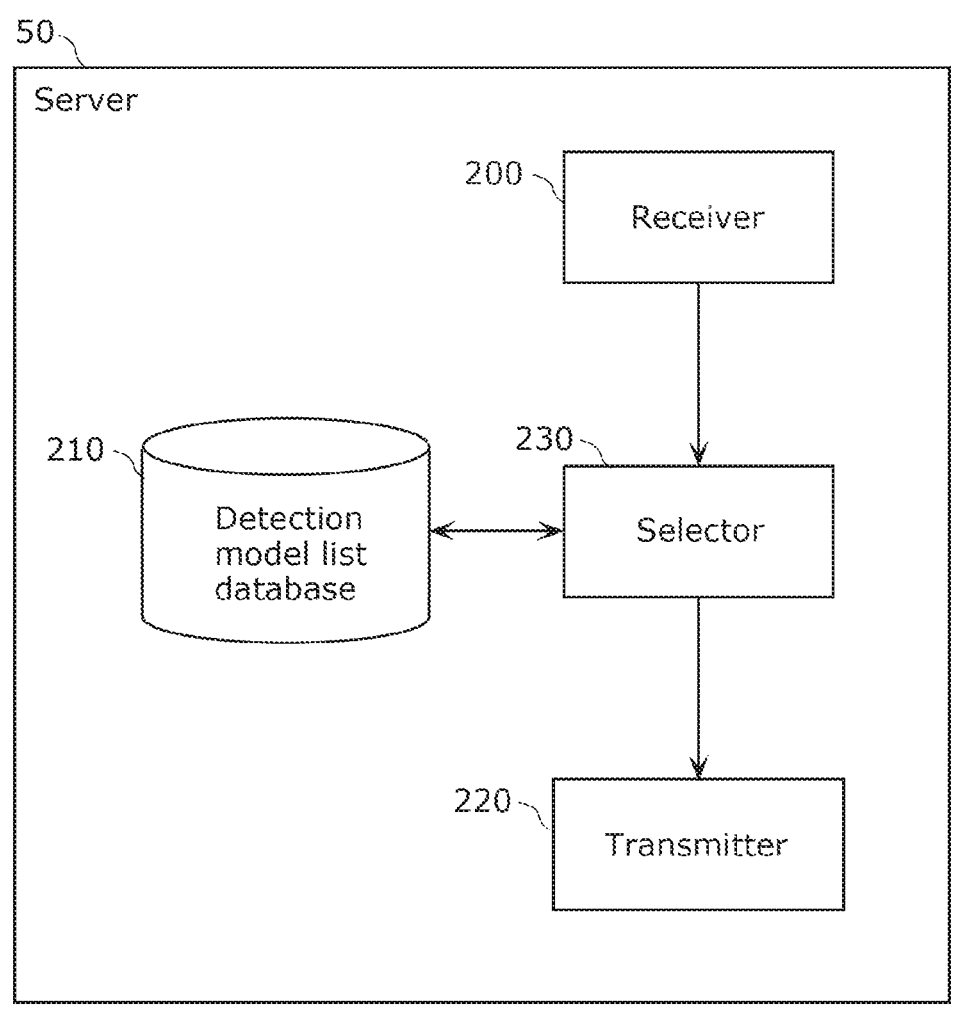
FIG. 4 is a diagram illustrating the configuration of a server according to Embodiment 1.
FIG. 5 is a diagram illustrating one example of a detection model database according to Embodiment 1.

FIG. 4 is a diagram illustrating the configuration of server 50 according to Embodiment 1.

As illustrated in FIG. 4, server 50 includes receiver 200, detection model list database 210, transmitter 220, and selector 230.

Receiver 200 receives a request from anomaly detection device using the home appliance operating protocol. In the present exemplary embodiment, receiver 200 receives a request packet compliant with the home appliance operating protocol from anomaly detection device 30.

In detection model list database 210, a plurality of detection model lists each of which includes a plurality of detection models are stored. Each of the detection model lists includes at least information indicating a device type and the operating state of the device type. A detection model list is selected according to the information indicating a device type and the operating state of the device type. In the present exemplary embodiment, each of the detection model lists includes a plurality of detection models that can be selected according to the device type, the model number, and the operating state.

FIG. 5 is a diagram illustrating one example of detection model list database 210 according to Embodiment 1. In the example illustrated in FIG. 5, two detection model lists, namely, detection model list 1 and detection model list 2, are stored in detection model list database 210. Detection model list 1 includes a plurality of detection models that can be used to detect an anomaly in a home appliance when the device type is an air conditioner, the model number is AB-XB-1, and the operating state is ON indicating that it is operating. Similarly, detection model list 2 includes a plurality of detection models that can be used to detect an anomaly in a home appliance when the device type is an air conditioner, the model number is AB-XB-1, and the operating state is OFF indicating that it is not operating.

Selector 230 checks whether there is a detection model list corresponding to the request received by receiver 200. In the present exemplary embodiment, selector 230 checks whether detection model list database 210 includes a detection model list corresponding to the request received by receiver 200. Subsequently, when there is a corresponding detection model list, selector 230 selects the corresponding detection model list from detection model list database 210. Note that when there is no corresponding detection model list, selector 230 selects a predetermined detection model list from detection model list database 210. The predetermined detection model list is a detection model list to be selected on a predetermined condition when one detection model list cannot be selected according to the device type, the model number, and the operating state. The predetermined detection model list is, for example, a detection model list to which at least one of the device type, the device number, and the operating state corresponds.

Transmitter 220 transmits the detection model list selected by selector 230 to anomaly detection device 30. Transmitter 220 may use the home appliance operating protocol to transmit the detection model list selected by selector 230 to anomaly detection device 30. For example, transmitter 220 transmits the detection model list selected by selector 230 to anomaly detection device 30, specifically, the source IP address of the request packet obtained from the home appliance operating protocol, that is, the IP address of anomaly detection device 30.

Next, the processing performed by server 50 will be described in detail.

FIG. 6 is a flowchart illustrating one example of the processing performed by server 50 according to Embodiment 1.

Server 50 receives a request (S201). More specifically, receiver 200 receives a request compliant with the home appliance operating protocol.

Next, server 50 obtains a device type and a model number from the received request (S202). More specifically, selector 230 obtains a device type, a model number, and an operating state included in the request received in Step S201.

Next, server 50 checks whether there is a corresponding detection model list (S203). More specifically, selector 230 checks whether detection model list database 210 includes a detection model list corresponding to the device type, the model number, and the operating state obtained in Step S202.

When there is a corresponding detection model list in Step S203 (Yes in S203), server 50 selects the corresponding detection model list (S204). More specifically, when there is a corresponding detection model list, selector 230 selects the corresponding detection model from detection model list database 210.

On the other hand, when there is no corresponding detection model list in Step S203 (No in S203), server 50 selects a predetermined detection model list (S205). More specifically, when there is no corresponding detection model list, selector 230 selects the predetermined detection model list from detection model list database 210.

Next, server 50 transmits the selected detection model list (S206). More specifically, transmitter 220 transmits the selected detection model list to the source IP address of the request packet obtained from the home appliance operating protocol.

The following describes the example illustrated in FIG. 5. For example, assume that receiver 200 receives a request including information indicating that the device type is an air conditioner, the model number is AB-XB-1, and the operating state is ON. In this case, selector 230 selects detection model list 1 from detection model list database 210 illustrated in FIG. 5. Subsequently, transmitter 220 transmits detection model list 1 to the source IP address of the request packet.

Hereinafter, anomaly detection device 30 will be described in detail.

[1.1.3 Details of Anomaly Detection Device 30]

Figure 7:
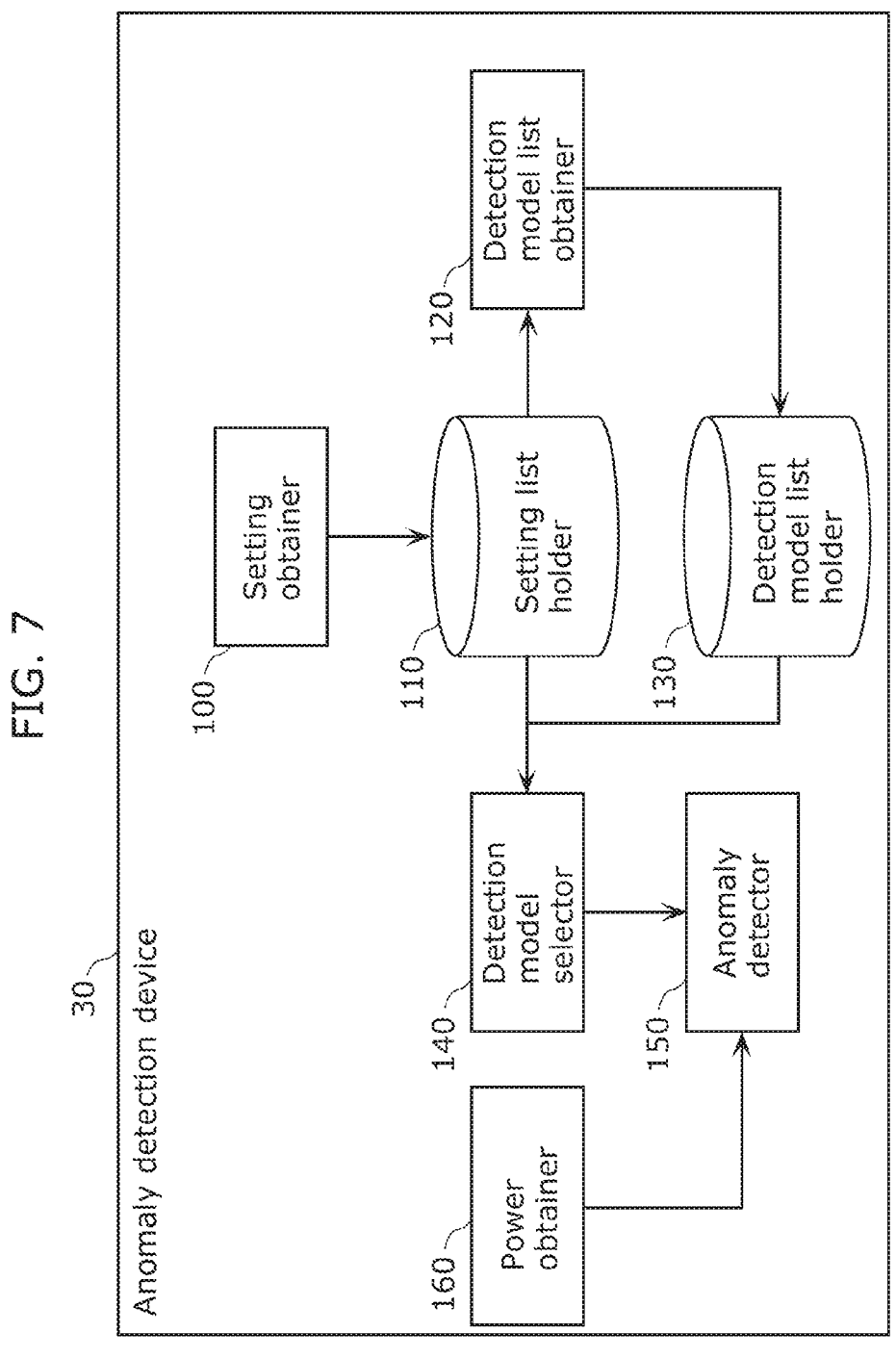
FIG. 7 is a diagram illustrating the configuration of an anomaly detection device according to Embodiment 1.

FIG. 7 is a diagram illustrating the configuration of anomaly detection device 30 according to Embodiment 1.

As illustrated in FIG. 7, anomaly detection device 30 includes setting obtainer 100, setting list holder 110, detection model list obtainer 120, detection model list holder 130, detection model selector 140, anomaly detector 150, and power obtainer 160. Anomaly detection device 30 may further include an outputter (not illustrated in the drawings). When anomaly detection device 30 does not include the outputter, the function of the outputter may be included in anomaly detector 150.

Note that the elements illustrated in FIG. 7 are functional elements representing functions. When anomaly detection device 30 reads and executes a program held in storage (not illustrated in the drawings) using a processor, predetermined data is held in the storage or data is transmitted or received via an input/output unit, for example.

Setting obtainer 100 obtains a plurality of setting values including at least information indicating the device type and the operating state of home appliance 40 using the home appliance operating protocol. Setting obtainer 100 stores the obtained setting values into setting list holder 110 as a setting list. Note that in the present exemplary embodiment, setting obtainer 100 may obtain, as the operating state of home appliance 40 that is a target device subject to malware detection, an operating state in the device object super class of the ECHONET Lite to be described later.

In the present exemplary embodiment, when setting obtainer 100 holds the IP address of home appliance 40 in advance, setting obtainer 100 transmits, to home appliance 40, an ECHONET Lite frame for requesting the manufacturer code, the serial number, and the operating state of home appliance 40. Subsequently, setting obtainer 100 obtains, from home appliance 40 that has received the ECHONET Lite frame, an ECHONET Lite frame including the manufacturer code, the serial number, and the operating state of home appliance 40.

Figure 8:
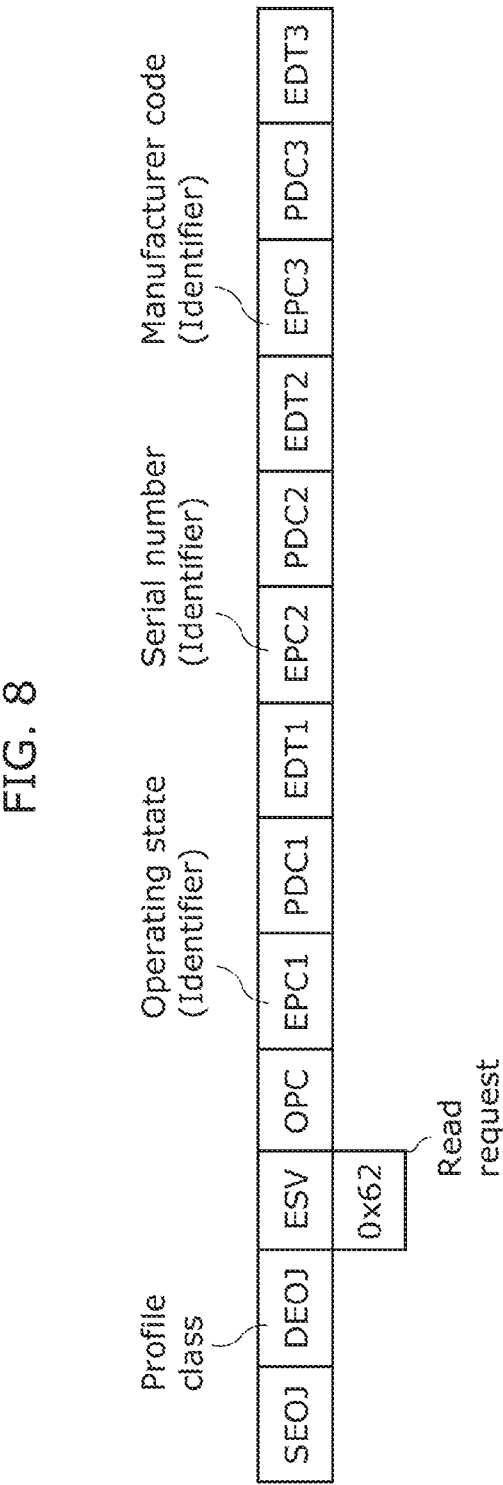
FIG. 8 is a diagram illustrating one example of an ECHONET Lite (registered trademark) frame for requesting a setting value of a home appliance according to Embodiment 1.

FIG. 8 is a diagram illustrating one example of an ECHONET Lite frame for requesting a setting value of home appliance 40 according to Embodiment 1.

ESV is a field in which an identifier indicating the type of the ECHONET Lite frame is stored, and one or more EPCs are fields in which identifiers indicating requested settings are stored.

In the example illustrated in FIG. 8, a read request indicated by the identifier "0x62" is set in the ESV, an identifier indicating an operating state is set in EPC1, an identifier indicating a serial number is set in EPC2, and an identifier indicating a manufacturer code is set in EPC3, for example.

As just mentioned, FIG. 8 illustrates an ECHONET Lite frame for requesting a manufacturer code, a serial number, and an operating state. Note that SEOJ indicated in FIG. 8 indicates an air conditioner class inheriting the device object super class of the ECHONET Lite and includes, for example, an ID indicating an air conditioner class. Note that the SEOJ is a field indicating what home appliance the communication destination of the ECHONET Lite frame is.

FIG. 9 is a diagram illustrating one example of an ECHONET Lite frame for returning the setting value of home appliance 40 according to Embodiment 1. Detailed description of elements that are substantially the same as those illustrated in FIG. 8 will be omitted.

The ECHONET Lite frame illustrated in FIG. 9 is an ECHONET Lite frame as a reply to the ECHONET Lite frame as the read request illustrated in FIG. 8. Therefore, a read response indicated by the identifier "0x72" is set in the ESV, for example.

Furthermore, the operating state indicated by the identifier "0x80", for example, is set in EPC1, and ON indicating that home appliance 40 indicated by the identifier "0x30", for example, is in an operating state is set in EDT1. The serial number indicated by the identifier "0x8D", for example, is set in EPC2, and XB-1 which is a model number (serial number) of home appliance 40 indicated by the identifier "0x••", for example, is set in EDT2. The manufacturer code indicated by the identifier "0x8A", for example, is set in EPC3, and AB which is a manufacturer code of home appliance 40 indicated by the identifier "0x••", for example, is set in EDT3.

Note that in the present exemplary embodiment, setting obtainer 100 regards, as a product model number, the manufacturer code and the serial number obtained from home appliance 40. Setting obtainer 100 stores, into setting list holder 110, the IP address, the device type, the model number of the product, and the operating state which are the plurality of setting values obtained from home appliance 40.

FIG. 10 is a diagram illustrating one example of a setting list according to Embodiment 1.

As illustrated in FIG. 10, the IP address, the device type, the product model number, and the current operating state of home appliance 40 are stored in the setting list.

The device type indicates a function-based category of home appliances; for example, when home appliance 40 is an air conditioner, the device type shows information indicating an air conditioner such as an identifier indicating an air conditioner. The model number shows information for uniquely identifying a product. The model number does not necessarily need to be the model number itself assigned to the product by the manufacturer of the product. For example, the combination of an identifier indicating a first manufacturer and the model number of a first product may be used as new information indicating the model number of the first product or the combination of an identifier indicating a second manufacturer and the model number of a second product may be used as new information indicating the model number of the second product. This is because the model number of the first product manufactured by the first manufacturer and the model number of the second product manufactured by the second manufacturer may happen to coincide with each other.

Here, for example, assume that the IP address of home appliance 40 is xx.xx.xx.xx, the device type thereof is an air conditioner, the manufacturer code thereof is AB, the serial number thereof is AB-XB-1, and the operating state thereof is ON. In this case, the IP address, the device type, the product model number, and the current operating state of home appliance 40 are set in No. 1 of the setting list illustrated in FIG. 10.

The foregoing describes the case where setting obtainer 100 holds the IP address of home appliance 40 in advance, but this is not limiting.

Assume that setting obtainer 100 does not hold the IP address of home appliance 40 in advance, but holds the product model number or the device type of home appliance 40 instead of the IP address. In this case, it is sufficient that setting obtainer 100 transmit the ECHONET Lite packet in a multicast or broadcast fashion and hold the IP address of home appliance 40 using one or more responses received. Specifically, it is sufficient that setting obtainer 100 extract, from the one or more responses received, a response including the product model number or the device type of home appliance 40, and hold, as the IP address of home appliance 40, the source IP address included in the extracted response.

Note that setting obtainer 100 may cause the setting list to hold a MAC address instead of the IP address. Furthermore, setting obtainer 100 may add, to the setting list, a setting value associated with the model number or the device type, in addition to the setting values of the IP address, the device type, the model number, and the operating state illustrated in FIG. 10. For example, when the device type is an air conditioner, setting obtainer 100 may further add setting values of a temperature setting, a fan speed, ON/OFF of a power saving setting, and the like to the setting list.

Furthermore, when a setting list has already been held in setting list holder 110 at the time of storing a setting list into setting list holder 110, setting obtainer 100 may delete the setting list held by setting list holder 110 and cause only the latest setting list to be stored, but this is not limiting. Setting obtainer 100 may store the combination of the setting list held by setting list holder 110 and the latest setting list. When combining the held setting list and the latest setting list, information such as a timestamp may be added to the setting list upon combination in order to prevent overlap of rows in the setting list.

Discussion will now return to the description of FIG. 7.

Detection model list obtainer 120 obtains the device type, the product model number, and the operating state of home appliance 40 from the setting list held by setting list holder 110.

When the setting list held by setting list holder 110 does not include a row including the device type, the product model number, and the operating state of home appliance 40 that have been obtained, detection model list obtainer 120 obtains, from server 50, a detection model list of the home appliance corresponding to the device type, the product model number, and the operating state. Detection model list obtainer 120 stores the obtained detection model list into detection model list holder 130.

FIG. 11 is a diagram illustrating one example of the detection model list held by detection model list holder 130 according to Embodiment 1. In the example illustrated in FIG. 11, two detection model lists, namely, detection model list 1 and detection model list 2, are held in detection model list holder 130.

Detection model list 1 includes a plurality of detection models that can be used to detect an anomaly in a home appliance when the device type of the home appliance is an air conditioner, the model number thereof is AB-XB-1, and the operating state thereof is ON, as in FIG. 5. Detection model list 2 includes a plurality of detection models that can be used to detect an anomaly in a home appliance when the device type is an air conditioner, the model number is AB-XB-1, and the operating state is OFF, as in FIG. 5.

Note that detection model list obtainer 120 may obtain the detection model list from somewhere other than server 50. For example, instead of server 50, detection model list obtainer 120 may hold a database (not illustrated in the drawings) in advance. In this case, detection model list obtainer 120 can obtain a detection model list from the database.

Detection model selector 140 selects one detection model out of a plurality of detection models according to a plurality of setting values including at least information indicating a device type and an operating state. In the present exemplary embodiment, detection model selector 140 obtains a plurality of setting values, specifically, the device type, the product model number, and the operating state of home appliance 40, from the setting list held by setting list holder 110. Detection model selector 140 selects, from the detection model list held by detection model list holder 130, one detection model corresponding to the device type, the product model number, and the operating state of home appliance 40 that have been obtained.

For example, detection model selector 140 may extract a row including the IP address of home appliance 40 from the setting list and select, from the detection model list, a detection model including said IP address and the product model number and the operating state of home appliance 40.

Note that in addition to the device type, the model number, and the operating state, a setting value associated with the model number or the device type may be added to each of the detection models included in the detection model list. For example, setting values of a fan speed, ON/OFF of a power saving setting, and the like may be added to each of the detection models in which the device type is an air conditioner. This means that in addition to the setting values of the device type, the model number, and the operating state, all possible combinations of setting values of the fan speed, the power saving setting, and the like may be added to each of the detection models included in the detection model list.

Discussion will now return to the description of FIG. 7.

Power obtainer 160 obtains power or current consumption of home appliance 40 that is a target device subject to malware detection. In the present exemplary embodiment, power obtainer 160 obtains the power value or the electric current value of home appliance 40 using the home appliance operating protocol. In the present exemplary embodiment, power obtainer 160 obtains an instantaneous power consumption measurement or a cumulative power consumption measurement in the device object super class of the ECHONET Lite as the power or current consumption of home appliance 40 that is a target device subject to malware detection.

Using one detection model selected by detection model selector 140, anomaly detector 150 detects, from the power or current consumption obtained by power obtainer 160, whether home appliance 40 that is a target device is infected with malware. In the present exemplary embodiment, anomaly detector 150 inputs the power value or the electric current value obtained by power obtainer 160 to one detection model selected by detection model selector 140, and thus obtains output indicating whether home appliance 40 is infected with malware. Anomaly detector 150 outputs a value obtained by inputting the power or current consumption to one detection model and indicating whether home appliance 40 that is a target device subject to malware detection is infected with malware.

Here, the selected one detection model may be one or more parameters indicating threshold values of the power consumption value or the electric current value of home appliance 40 with the plurality of setting values obtained. Alternatively, the one selected detection model may be a neural network that receives the power value or the electric current value of home appliance 40 as input. In this case, when said one detection model receives the power value or the electric current value of home appliance 40, said one detection model outputs values such as the strength of the connection between neurons in the neural network. Alternatively, the selected one detection model may be the normal distribution of the power value or the electric current value, for example. In this case, when said one detection model receives the power value or the electric current value of home appliance 40, said one detection model outputs values such as the mean and standard deviation of the normal distribution to be used to detect an anomaly.

Figure 12:
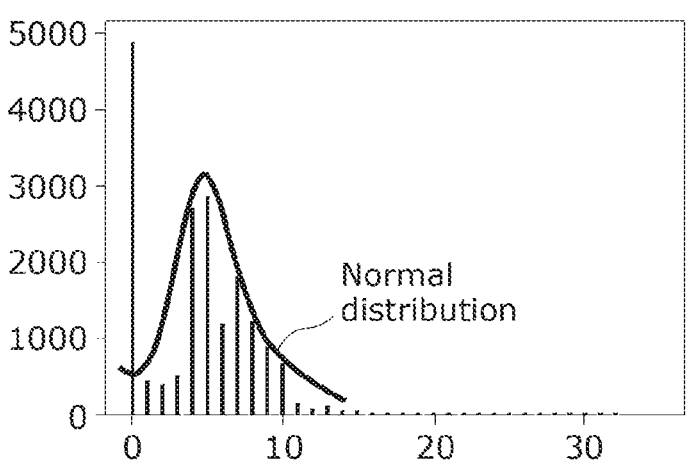
FIG. 12 is a diagram illustrating actual power values or electric current values and the normal distribution of a detection model for a home appliance according to Embodiment 1.
Figure 13:
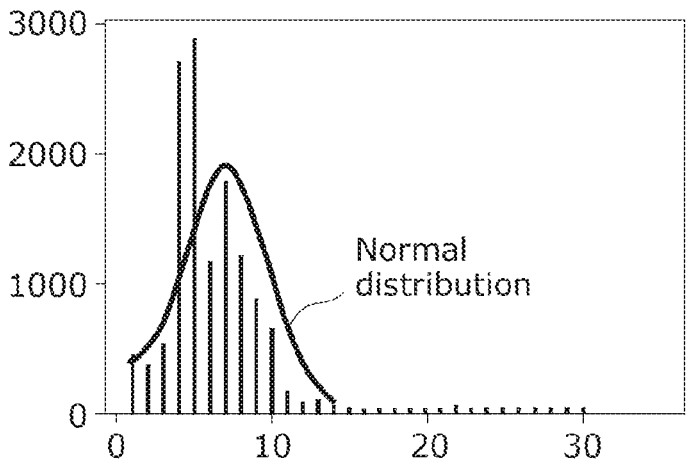
FIG. 13 is a diagram illustrating actual power values or electric current values and the normal distribution of a detection model for a home appliance according to Embodiment 1.

FIG. 12 and FIG. 13 are diagrams each illustrating actual power values or electric current values and the normal distribution of a detection model for home appliance 40 according to Embodiment 1. The detection models illustrated in FIG. 12 and FIG. 13 are different because the plurality of setting values on home appliance 40 are different.

Note that there are cases where the selected one detection model further includes the fan speed, the power saving setting, and the like in addition to the setting values of the device type, the model number, and the operating state. In this case, anomaly detector 150 may input a plurality of setting values of home appliance 40 in addition to the power value or the electric current value to the one detection model selected by detection model selector 140, to detect whether home appliance 40 is infected with malware. For example, when home appliance 40 is an air conditioner, anomaly detector 150 may input a power value and a fan speed setting to one detection model selected by detection model selector 140, to cause the one detection model to detect whether home appliance 40 is infected with malware.

Furthermore, when anomaly detector 150 detects that home appliance 40 that is a target device subject to malware detection is infected with malware, anomaly detector 150 may notify, for example, the owner of said home appliance 40, that home appliance 40 is infected with malware.

[1.2 Operation of Anomaly Detection Device 30]

Hereinafter, the operation of anomaly detection device 30 will be described in the following order:

(1) a main process;

(2) a setting value obtainment process;

(3) a detection model selection process; and (4) a power obtainment process.

[1.2.1 Main Process]

Figure 14:
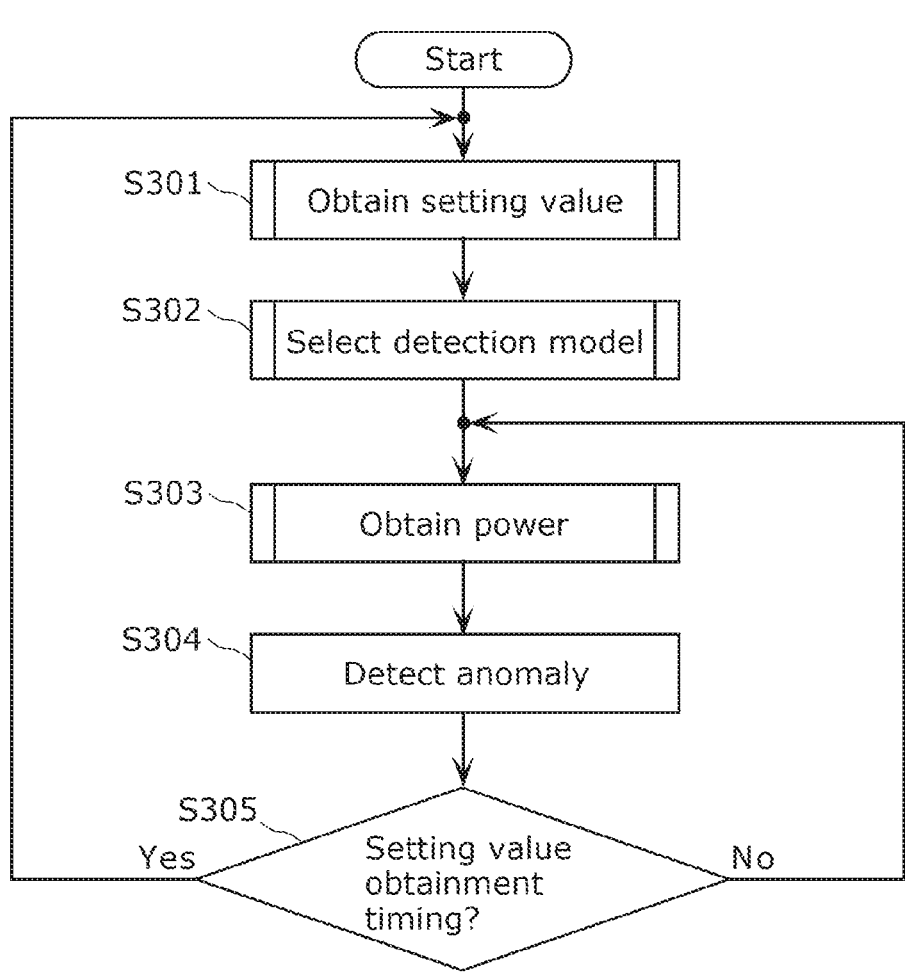
FIG. 14 is a flowchart illustrating one example of a main process performed by an anomaly detection device according to Embodiment 1.

FIG. 14 is a flowchart illustrating one example of the main process performed by anomaly detection device 30 according to Embodiment 1.

In FIG. 14, first, anomaly detection device 30 performs the processing of obtaining setting values of home appliance 40 (S301). More specifically, setting obtainer 100 performs the setting value obtainment process of obtaining a plurality of setting values including at least information indicating the device type and the operating state of home appliance 40 that is a target device subject to malware detection. Setting obtainer 100 stores the plurality of setting values obtained by performing the setting value obtainment process into setting list holder 110 as a setting list. The information indicating the operating state of home appliance 40 indicates whether a home appliance that is a target device subject to malware detection is in an operating state or a stopped state. For example, setting obtainer 100 can obtain an operating state in the device object super class of the ECHONET Lite as the operating state of home appliance 40.

Next, anomaly detection device 30 performs the processing of selecting a detection model corresponding to the setting values of home appliance 40 (S302). More specifically, detection model selector 140 performs the detection model selection process of selecting one detection model out of the plurality of detection models according to the plurality of setting values obtained in Step S301.

Next, anomaly detection device 30 performs the processing of obtaining the power value or the electric current value of home appliance 40 using the home appliance operating protocol (S303). More specifically, power obtainer 160 performs the power obtainment process of obtaining power or current consumption of home appliance that is a target device subject to malware detection. For example, power obtainer 160 can obtain an instantaneous power consumption measurement or cumulative power consumption measurement in the device object super class of the ECHONET Lite as the power or current consumption of home appliance 40.

Next, using the detection model associated with the settings of home appliance 40, anomaly detection device 30 detects whether home appliance 40 is infected with malware (S304). More specifically, using the one detection model selected in Step S302, from the power or current consumption (the power value or the electric current value) obtained in Step S303, anomaly detector 150 detects whether home appliance 40 that is a target device subject to malware detection is infected with malware. Anomaly detector 150 outputs a value obtained by inputting the power value or the electric current value of home appliance 40 to the one detection model selected in Step S302 and indicating whether home appliance 40 is infected with malware.

Next, anomaly detection device 30 determines whether the current time is a timing (a setting value obtainment timing) at which the setting values of home appliance 40 are to be obtained (S305). More specifically, setting obtainer 100 determines whether the current time is the setting value obtainment timing of home appliance 40.

When the current time is the setting value obtainment timing in Step S305 (Yes in S305), anomaly detection device 30 returns to Step S301 and performs again the processing of obtaining setting values. For example, when a predetermined length of time has elapsed after the time at which the setting values of home appliance were obtained, it is sufficient that setting obtainer 100 obtain setting values again.

On the other hand, when the current time is not the setting value obtainment timing in Step S305 (No in S305), anomaly detection device 30 returns to Step S303 and performs the processing of obtaining a power value or an electric current value again. For example, when a predetermined length of time has not elapsed from the time at which the setting values of home appliance 40 were obtained, it is sufficient that power obtainer 160 obtain a power value or an electric current value again.

[1.2.2 Setting Value Obtainment Process]

Figure 15A:
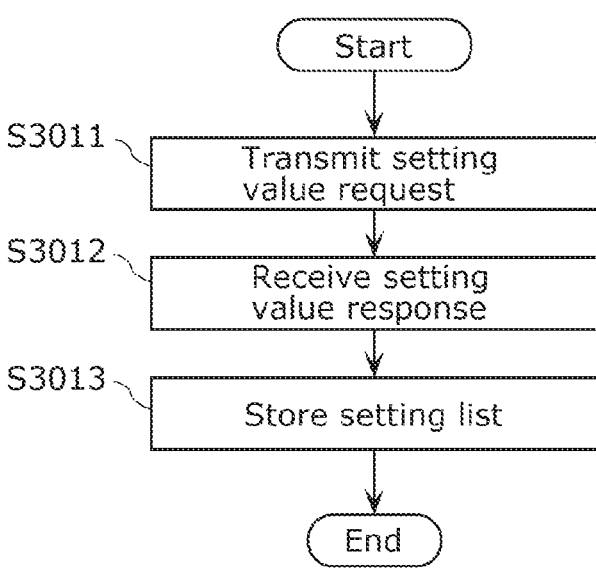
FIG. 15A is a flowchart illustrating one example of a setting value obtainment process performed by an anomaly detection device according to Embodiment 1.

FIG. 15A is a flowchart illustrating one example of the setting value obtainment process performed by anomaly detection device 30 according to Embodiment 1. FIG. 15A illustrates the details of Step S301 illustrated in FIG. 14.

In Step S301, first, anomaly detection device 30 transmits a setting value request regarding home appliance 40 (S3011). More specifically, using the home appliance operating protocol, setting obtainer 100 transmits, to home appliance 40, a message for requesting a plurality of setting values that have been set on home appliance 40.

Note that when the IP addresses or the MAC addresses of all home appliances located within home network 11 are known, setting obtainer 100 may transmit the message to each of the home appliances. When the IP address or the MAC address of home appliance 40 that is a target device subject to malware detection is not known, setting obtainer 100 may transmit the messages at once to all the home appliances located within home network 11 using IP broadcast or multicast.

Next, anomaly detection device 30 receives a setting value response from home appliance 40 (S3012). More specifically, using the home appliance operating protocol, setting obtainer 100 receives, from home appliance 40, a response including a plurality of setting values that have been set on home appliance 40.

Next, setting obtainer 100 stores, as a setting list, the plurality of setting values obtained in Step S3012 (S3013). More specifically, setting obtainer 100 stores, as a setting list into setting list holder 110, the plurality of setting values that have been set on home appliance 40 and obtained in Step S3012.

[1.2.3 Detection Model Selection Process]

Figure 15B:
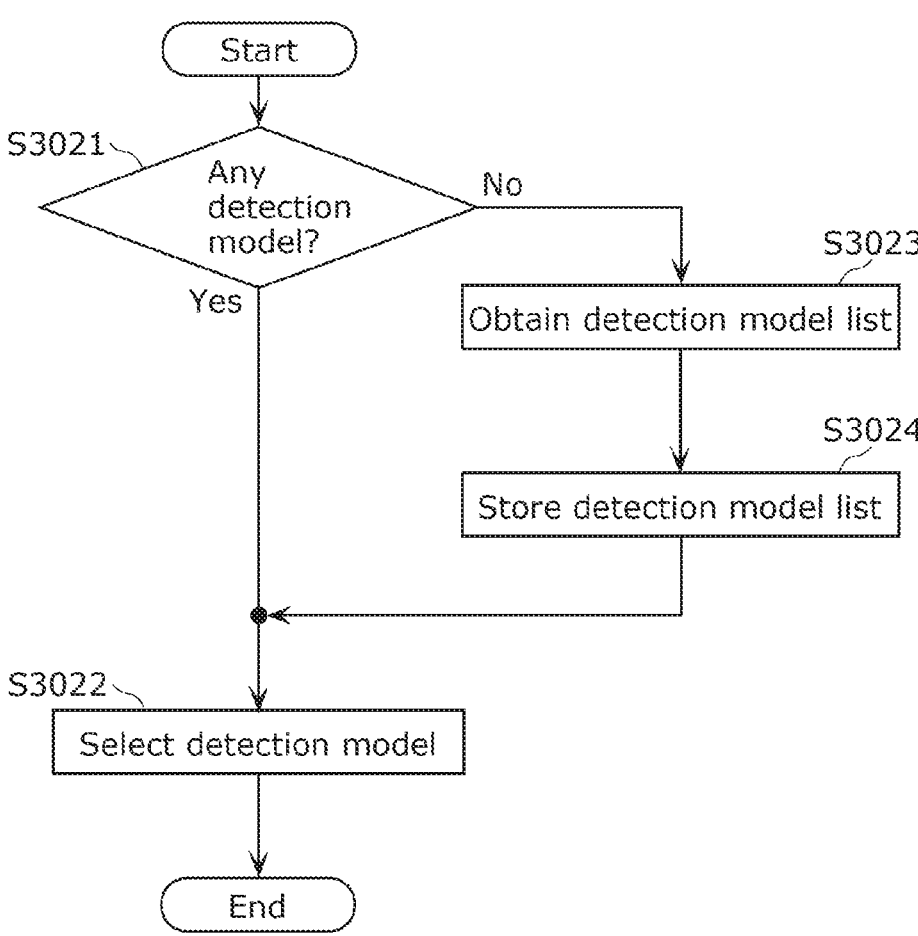
FIG. 15B is a flowchart illustrating one example of a detection model selection process performed by an anomaly detection device according to Embodiment 1.

FIG. 15B is a flowchart illustrating one example of the detection model selection process performed by anomaly detection device 30 according to Embodiment 1. FIG. 15B illustrates the details of Step S302 illustrated in FIG. 14.

In Step S302, first, anomaly detection device 30 determines whether the detection model list held by detection model list holder 130 includes a detection model corresponding to the setting values of home appliance 40 (S3021). More specifically, detection model list obtainer 120 obtains the latest device type, the latest model number, and the latest operating state of home appliance 40 included in the setting list held by setting list holder 110. Detection model list obtainer 120 determines whether the detection model list held by detection model list holder 130 includes a row including a device type, a model number, and an operating state that are the same as the latest device type, the latest model number, and the latest operating state of home appliance 40 obtained.

When the detection model list held includes a detection model corresponding to the setting values of home appliance 40 in Step S3021 (Yes in S3021), detection model selector 140 selects one detection model from the detection model list according to the setting values of home appliance 40 (S3022). More specifically, when the detection model list held by detection model list holder 130 includes a row including a device type, a model number, and an operating state that are the same as the latest device type, the latest model number, and the latest operating state of home appliance 40, detection model selector 140 selects a detection model in said row. In this manner, detection model selector 140 selects, from the detection model list held by detection model list holder 130, a detection model corresponding to the setting values of home appliance 40 stored in setting list holder 110.

On the other hand, when the detection model list held does not include a detection model corresponding to the setting values of home appliance 40 in Step S3021 (No in S3021), detection model list obtainer 120 obtains, from server 50, a detection model list corresponding to the current setting values of home appliance 40 (S3023). More specifically, when there is no row including a device type, a model number, and an operating state that are the same as the device type, the model number, and the operating state of home appliance 40, detection model list obtainer 120 obtains, from server 50, a detection model list corresponding to the current setting values of home appliance 40.

Next, detection model list obtainer 120 stores, into detection model list holder 130, the detection model list obtained from server 50 (S3024).

Note that when detection model list obtainer 120 fails to obtain the detection model list from server 50 in Step S3024, the subsequent processing may be suspended, but this is not limiting. For example, detection model list obtainer 120 may determine, in advance, a second detection model list to be obtained in case of a failure to obtain a detection model list, and thus obtain the second detection model list.

[1.2.4 Power Obtainment Process]

Figure 15C:
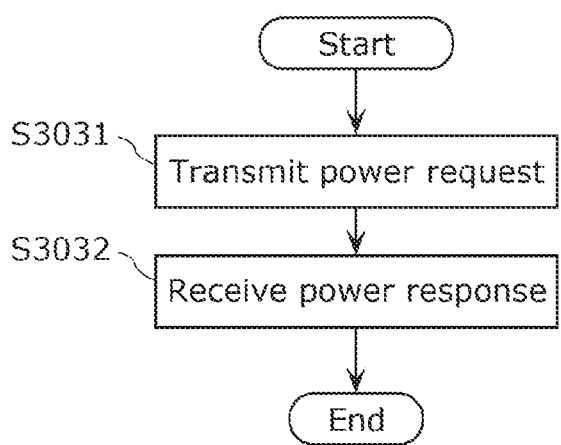
FIG. 15C is a flowchart illustrating one example of a power obtainment process performed by an anomaly detection device according to Embodiment 1.

FIG. 15C is a flowchart illustrating one example of the power obtainment process performed by anomaly detection device 30 according to Embodiment 1. FIG. 15C illustrates the details of Step S303 illustrated in FIG. 14.

In Step S303, first, anomaly detection device 30 transmits a power request regarding home appliance 40 (S3031). More specifically, using the home appliance operating protocol, power obtainer 160 transmits, to home appliance 40, a message for requesting the power value or the electric current value of home appliance 40.

Next, anomaly detection device 30 receives a power response from home appliance 40 (S3032). More specifically, using the home appliance operating protocol, power obtainer 160 receives a response including the power value or the electric current value of home appliance 40.

[1.3 Advantageous Effects of Embodiment 1]

Home appliance 40 that can be connected to Internet 10 may be infected with malware via Internet 10 and misused due to the malware residing, which is a risk. On the other hand, compared to personal computers, smartphones, and so on, home appliance 40 has less resources, meaning that an anti-malware application or an anti-malware software product such as those introduced into personal computers, smartphones, and so on cannot be introduced into home appliance 40.

Meanwhile, the malware is a program that resides in home appliance 40 infected therewith and consumes power of home appliance 40. Therefore, whether home appliance 40 is infected with malware can be detected by comparing the power or current consumption (the power value or the electric current value) of normal home appliance 40 uninfected with the malware and the power or current consumption (the power value or the electric current value) of home appliance 40 infected with the malware.

However, home appliance 40 is an air conditioner or the like, and the normal power consumption of the air conditioner cannot be uniformly estimated, but can be comprehensively estimated from a power value (or an electric current value) and a plurality of setting values such as a manufacturer, a model number, and an operating state.

Thus, in the present exemplary embodiment, one detection model corresponding to the plurality of setting values that have been set on home appliance 40 is selected from the detection model list held by detection model list holder 130. Subsequently, using the selected detection model, malware detection (anomaly detection) is performed to detect, from the power value or the electric current value obtained from power obtainer 160, whether home appliance 40 is infected with malware.

In this manner, by selecting and using a detection model suitable for normal power consumption of home appliance 40 having a variable power value or electric current value according to the plurality of setting values that have been set on home appliance 40, it is possible to detect malware in home appliance 40 more accurately on the basis of the current power value or electric current value of home appliance 40.

Embodiment 2

Embodiment 1 describes the case of detecting malware in home appliance 40 by selecting and using one detection model on the basis of the plurality of setting values that are common to home appliance 40, but this is not limiting. Home appliance 40 has one or more setting values unique to each device type. Therefore, it can be expected that when the setting values unique to each device type are used, the accuracy of detecting malware will be improved. In the present exemplary embodiment, it is assumed that home appliance 40 is air conditioner 40a. Note that structural elements including functions that are substantially the same as the functions of the structural elements, etc., described in Embodiment 1 will be assigned the same reference signs, and detailed description thereof will be omitted.

[2.1 Overall Configuration of Malware Detection System for Home Appliances]

Figure 16:
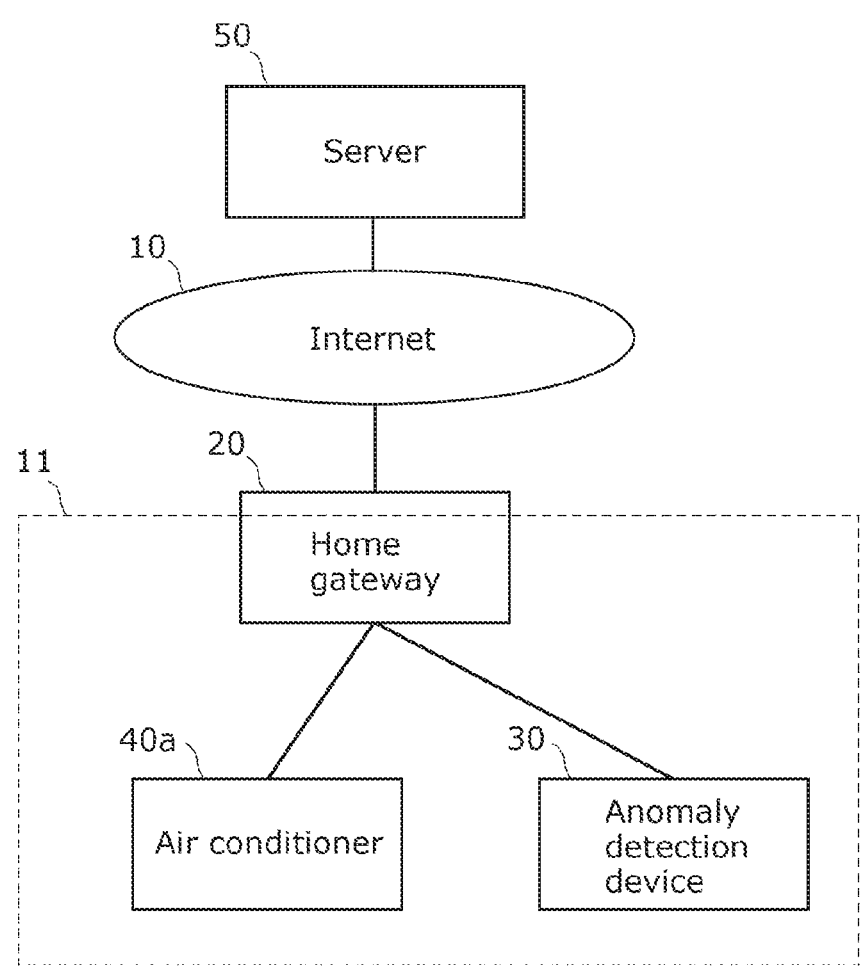
FIG. 16 is a diagram illustrating the overall configuration of a malware detection system according to Embodiment 2.

FIG. 16 is a diagram illustrating the overall configuration of a malware detection system according to Embodiment 2. Elements that are substantially the same as those illustrated in FIG. 1 are assigned the same reference signs.

The configuration of the malware detection system illustrated in FIG. 16 is different from the configuration of the malware detection system illustrated in FIG. 1 in that home appliance 40 is air conditioner 40a.

Air conditioner 40a, which is one example of home appliance according to Embodiment 1, includes a heating function, a cooling function, and a dehumidification function. In the present exemplary embodiment, during the operation with one of these functions, air conditioner 40a can transmit an identifier indicating the function in operation to anomaly detection device 30 as a setting value of air conditioner 40a using the home appliance operating protocol. Hereinafter, an identifier indicating each of the heating function, the cooling function, and the dehumidification function will be referred to as a mode.

Furthermore, air conditioner 40a can have a power saving setting turned on and transmit an identifier indicating whether air conditioner 40a is operating with the power saving setting on to anomaly detection device 30 as a setting value of air conditioner 40a using the home appliance operating protocol. Hereinafter, this identifier will be referred to as a power saving setting.

Furthermore, air conditioner 40a can have the fan speed adjusted and transmit an identifier indicating a fan speed that has been set on air conditioner 40a to anomaly detection device 30 as a setting value of air conditioner 40a using the home appliance operating protocol. Hereinafter, this identifier will be referred to as a fan speed setting.

Furthermore, air conditioner 40a may include a thermostat and can transmit an identifier indicating the state of the thermostat to anomaly detection device 30 as a setting value of air conditioner 40a using the home appliance operating protocol. Hereinafter, this identifier will be referred to as a thermostat setting. Note that when the thermostat setting is ON, this indicates that the temperature has not reached a temperature that has been set on air conditioner 40a, and when the thermostat setting is OFF, this indicates that the temperature has reached a temperature that has set on air conditioner 40a.

Furthermore, air conditioner 40a includes a compressor and can transmit an identifier indicating whether the compressor is operating to anomaly detection device 30 as a setting value of air conditioner 40a using the home appliance operating protocol. Hereinafter, this identifier will be referred to as a compressor setting.

[2.2 Anomaly Detection Device 30]

Anomaly detection device 30 according to Embodiment 2 obtains the setting values and the power value (or the electric current value) of air conditioner 40a using the home appliance operating protocol. Anomaly detection device 30 according to Embodiment 2 selects one detection model corresponding to the setting values of air conditioner 40a that have been obtained, and detects, using the selected one detection model, whether air conditioner 40a is infected with malware.

Anomaly detection device 30 according to Embodiment 2 has substantially the same configuration as anomaly detection device 30 illustrated in FIG. 7. While air conditioner 40a is one example of home appliance 40 according to Embodiment 1, air conditioner 40a has unique settings. Therefore, the following describes setting obtainer 100 which obtains a plurality of setting values including unique settings and detection model list obtainer 120 which obtains a detection model list corresponding to the plurality of setting values including the unique settings.

Setting obtainer 100 obtains a plurality of setting values including at least information indicating the device type and the operating state of air conditioner 40a using the home appliance operating protocol. In the present exemplary embodiment, the plurality of setting values of air conditioner 40a may include information indicating whether air conditioner 40a is operating in the heating mode or the cooling mode. Furthermore, the plurality of setting values of air conditioner 40a may include information indicating whether air conditioner 40a is in a defrosting state, a residual heat state, or a heat removal state or may include information indicating whether the compressor is operating. Furthermore, the plurality of setting values of air conditioner 40a may include information indicating whether the thermostat is operating. Furthermore, the plurality of setting values of air conditioner 40a may include at least one of information indicating a fan speed and information indicating whether the power saving setting is ON.

Here, the defrosting state indicates a state where air conditioner 40a is operating in order to remove the frost formed on the outdoor unit of air conditioner 40a. The residual heat state (preheat state) is a state where an indoor fan is not operating or is rotating at low speed immediately after air conditioner 40a starts a heating operation or immediately after air conditioner 40a recovers from the defrost mode until the temperature of warm air increases and the air is blown out. The heat removal state is a state where the fan and the refrigeration cycle are operating in order to remove heat remaining in devices of air conditioner 40a immediately after air conditioner 40a stops operating.

Note that setting obtainer 100 can obtain, from a special state in the home air conditioner class of the ECHONET Lite, the information indicating whether air conditioner 40a is in the defrosting state, the information indicating whether air conditioner 40a is in the residual heat state, and the information indicating whether air conditioner 40a is in the heat removal state. The special state refers to one of the normal state, the defrosting state, the preheat state, and the heat removal state. Furthermore, setting obtainer 100 can obtain, from an internal operating state in the home air conditioner class of the ECHONET Lite, the information indicating whether the compressor of air conditioner 40a is operating and the information indicating whether the thermostat of air conditioner 40a is operating. The internal operating state refers to a state where the compressor is operating or not operating inside air conditioner 40a or a state where the state of the thermostat is ON or OFF inside air conditioner 40a. The state where the state of the thermostat is OFF refers to a state where the room temperature has reached a target temperature and the heat exchange is suspended (air conditioner 40a itself is operating). On the other hand, the state where the state of the thermostat is ON refers to a state where the room temperature differs from a target temperature to at least a certain extent and the heat exchange is being carried out.

Setting obtainer 100 stores the obtained setting values into setting list holder 110 as a setting list.

FIG. 17 is a diagram illustrating one example of a setting list according to Embodiment 2.

As illustrated in FIG. 17, the IP address, the device type, the product model number, the current operating state, the mode, the power saving setting, the fan speed setting, the thermostat setting, and the compressor setting of air conditioner 40a are stored in the setting list.

In the example illustrated in FIG. 17, No. 1 of the setting list indicates the setting values of air conditioner 40a in which the IP address of air conditioner 40a is xx.xx.xx.xx, the manufacturer code is AB, and the model number is AB-XB-1. Furthermore, No. 1 of the setting list indicates the setting values of air conditioner 40a in which the operating state is ON, the mode is heating, the power saving setting is ON, the fan speed setting is 3, the thermostat setting is ON, and the compressor setting is ON.

Note that a plurality of settings of home appliance 40 other than air conditioner 40a that does not have the mode, the power saving setting, the fan speed setting, the thermostat setting, or the compressor setting may be stored in the setting list illustrated in FIG. 17. In such a case, an identifier indicating that setting values indicating the mode, the power saving setting, the fan speed setting, the thermostat setting, and the compressor setting are not present may be stored in a row of the setting list that indicates the plurality of settings of home appliance 40 other than air conditioner 40a.

With reference to the setting list held by setting list holder 110, detection model list obtainer 120 according to Embodiment 2 obtains a plurality of setting values including the device type, the product model number, and the operating state of air conditioner 40a. Detection model list obtainer 120 according to Embodiment 2 obtains a detection model list from server 50 and stores the detection model list into detection model list holder 130, as necessary.

FIG. 18 is a diagram illustrating one example of the plurality of detection models included in the detection model list held by detection model list holder 130 according to Embodiment 2. In the example illustrated in FIG. 18, the detection model list held by detection model list holder 130 includes four detection models, namely, detection model 1 to detection model 4.

FIG. 18 indicates detection models 1 to 4 each associated with the device type, the product model number, the operating state, the mode, the power saving setting, the fan speed setting, the thermostat setting, and the compressor setting.

The detection model list illustrated in FIG. 18 includes, for example, detection models 1 to 3 associated with settings in which the product model number of air conditioner 40a is AB-XB-1 and the operating state thereof is ON. Detection model 1 is a detection model to be applied when the model number is AB-XB-1, the operating state is ON, the mode is heating, the power saving setting is ON, the fan speed setting is 1, the thermostat setting is ON, and the compressor setting is ON. Detection model 2 is a detection model to be applied when the model number is AB-XB-1, the operating state is ON, the mode is heating, the power saving setting is ON, the fan speed setting is 1, the thermostat setting is ON, and the compressor setting is OFF. Detection model 3 is a detection model to be applied when the model number is AB-XB-1, the operating state is ON, the mode is heating, the power saving setting is ON, the fan speed setting is 1, the thermo-stat setting is OFF, and the compressor setting is ON.

The detection model list illustrated in FIG. 18 likewise includes detection model 4 associated with settings in which the product model number of air conditioner 40a is AB-XB-1 and the operating state thereof is OFF. In detection model 4, the model number is AB-XB-1 and the operating state is OFF, but the mode, the power saving setting, the fan speed setting, the thermostat setting, and the compressor setting are undefined.

Note that the detection model list held by detection model list holder 130 is not limited to the example illustrated in FIG. 18. The detection model list may include a detection model that receives the fan speed setting in addition to the power value or the electric current value as input. In this case, it is sufficient that anomaly detector 150 input, to this detection model, the power value or the electric current value obtained by power obtainer 160 and the fan speed setting of air conditioner 40a included in the setting list held by setting list holder 110. Thus, using the detection model, anomaly detector 150 can obtain, as output for the input, a detection result indicating whether air conditioner 40a is infected with malware.

Embodiment 3

The value of electric power or current consumed during operation of some function of home appliance 40 may be great and the variation thereof may be irregular compared to the value of electric power or current consumed by malware affecting home appliance 40. In such a case, there is a possibility that the features of the value of electric power or current consumed by the malware affecting home appliance 40 may be less likely to appear in the power value or the electric current value obtained during the operation of the function of home appliance 40. This may result in an increase in the chance of malware detection error, that is, a reduction in malware detection accuracy.

In light of this case, in Embodiment 3, the malware detection is performed in a stable state where there is less variation in the value of electric power or current consumed by home appliance 40. Note that stable power or a stable state with stable power where the value of electric power or current consumed by home appliance 40 is small and does not vary much can also be referred to as a standby power state. In Embodiment 3, even a case where the value of electric power or current consumed by home appliance 40 is great, but does not vary much is also referred to as stable power or a stable state with stable power. Note that structural elements including functions that are substantially the same as the functions of the structural elements, etc., described in Embodiment 1 will be assigned the same reference signs, and detailed description thereof will be omitted.

The overall configuration of the malware detection system for home appliances according to Embodiment 3 is substantially the same as that illustrated in FIG. 1 according to Embodiment 1, and therefore description of the overall configuration will be omitted.

[3.1 Anomaly Detection Device 30]

Anomaly detection device 30 according to Embodiment 3 obtains the setting values and the power value (or the electric current value) of home appliance 40 using the home appliance operating protocol. Anomaly detection device 30 selects one detection model corresponding to the setting values of home appliance 40 that have been obtained. Here, using the home appliance operating protocol, anomaly detection device 30 may obtain the stable power (or the stable current) of home appliance 40 that is a target device subject to malware detection.

When the power value (or the electric current value) of home appliance 40 that has been obtained indicates stable power (or stable current) that varies within a predetermined range, anomaly detection device 30 according to Embodiment 3 detects, using the selected one detection model, whether home appliance 40 is infected with malware. Subsequently, anomaly detection device 30 outputs a value obtained by inputting the stable power (or the stable current) to the one detection model and indicating whether home appliance 40 that is a target device subject to malware detection is infected with malware.

Here, the stable power (or the stable current) may be the power (or the electric current) consumed by home appliance 40 that is a target device subject to malware detection when the operating state of home appliance 40 is OFF, for example. In this case, anomaly detection device 30 uses, as the stable power (or the stable current), the power consumption (or the current consumption) of home appliance 40 obtained when the operating state of home appliance 40 included in the plurality of setting values obtained indicates OFF. In other words, using the obtained power consumption (or current consumption) of home appliance 40 as the stable power (or the stable current), anomaly detection device 30 causes the selected one detection model to detect whether home appliance 40 is infected with malware. On the other hand, when the operating state of home appliance 40 included in the plurality of setting values obtained is ON, anomaly detection device 30 does not cause the selected one detection model to detect whether home appliance 40 is infected with malware.

Note that the stable power (or the stable current) is not limited to the power (or the electric current) consumed by home appliance that is a target device subject to malware detection when the operating state of home appliance 40 is OFF. When home appliance is an air conditioner, the stable power (or the stable current) may be the power (or the electric current) consumed by home appliance that is a target device subject to malware detection when the compressor is OFF. In this case, anomaly detection device 30 may use, as the stable power (or the stable current), the power consumption (or the current consumption) of home appliance 40 obtained when the compressor of the air conditioner, i.e., home appliance 40, included in the plurality of setting values obtained indicates OFF. Similarly, in this case, when the compressor of home appliance 40 included in the plurality of setting values obtained is ON, anomaly detection device 30 does not cause the selected one detection model to detect whether home appliance 40 is infected with malware.

[3.2 Operation of Anomaly Detection Device 30]

The operation of anomaly detection device 30 according to Embodiment 3 will be described in the following order:
   (1) a main process;
   (2) a setting value obtainment process;
   (3) a detection model selection process; and
   (4) a power obtainment process.

[3.2.1 Main Process]

Figure 19:
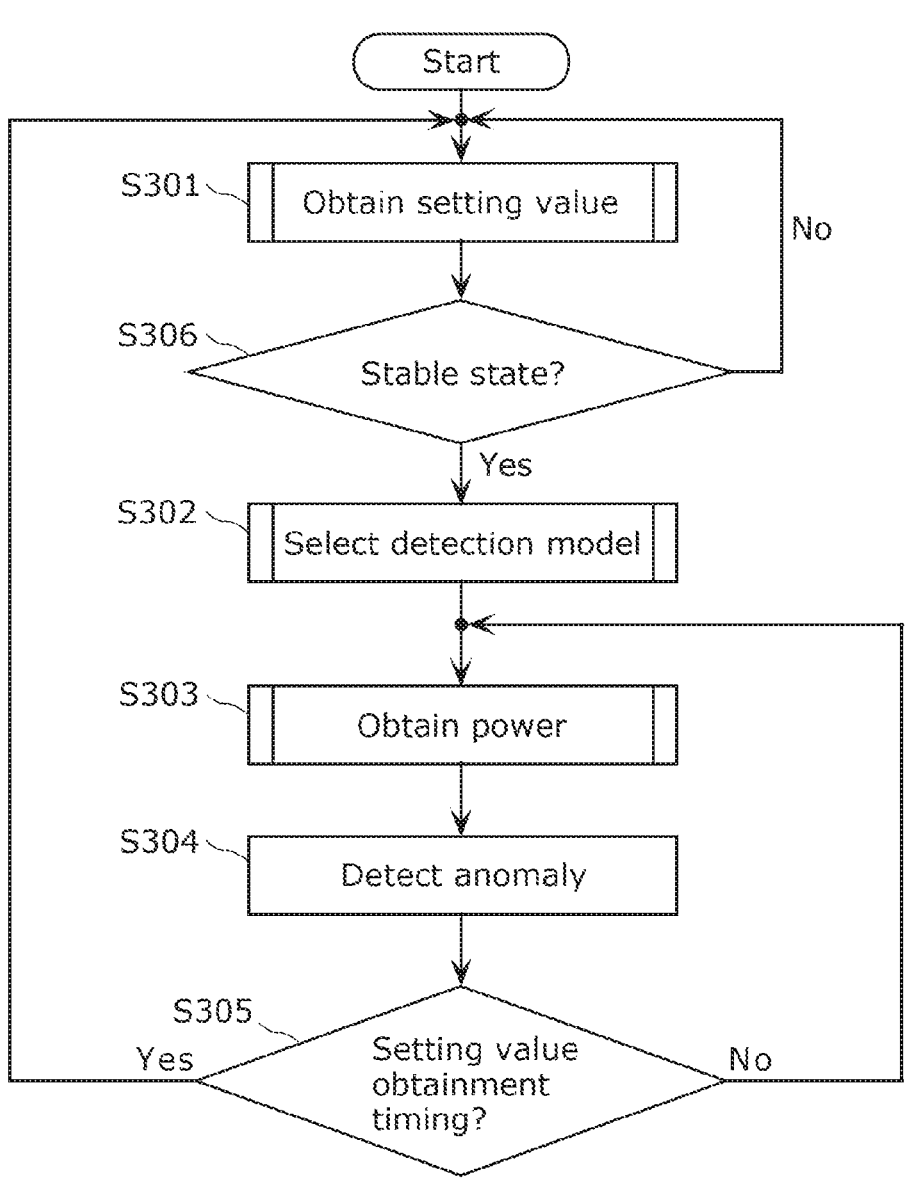
FIG. 19 is a flowchart illustrating one example of a main process performed by an anomaly detection device according to Embodiment 3.

FIG. 19 is a flowchart illustrating one example of the main process performed by anomaly detection device 30 according to Embodiment 3. Elements that are substantially the same as those illustrated in FIG. 14 are assigned the same reference signs and detailed description thereof will be omitted.

In Step S306, anomaly detection device 30 determines whether the power or current consumption of home appliance 40 is in the stable state. Anomaly detector 150 can determine, from the plurality of settings of home appliance 40 held in the setting list held by setting list holder 110, whether home appliance 40 is in the stable state.

The stable state may be a state where the operating state of home appliance 40 is OFF, for example. Note that the state where the operating state of home appliance 40 is OFF refers to a state where the main function of home appliance 40 is not in operation. However, even when the operating state of home appliance 40 is OFF, the main function can start by user operation with a remote control or by an operation performed in accordance with the home appliance operating protocol, meaning that a part of the functions of home appliance 40 remains in operation and power is being consumed.

Furthermore, in the state where the operating state of home appliance 40 is OFF, the variation in the electric power or current value of home appliance 40 is small and is within the predetermined range, in other words, the power value or the electric current value of home appliance 40 is stable. Therefore, as mentioned above, it can be expected that the features of power or current consumption during operation of the malware affecting home appliance 40 are likely to appear in the power value or the electric current value (the standby power or the standby current) of home appliance 40 in the stable state.

Furthermore, the stable state is not limited to the state where the operating state of home appliance 40 is OFF and includes a state where the operating state of home appliance 40 is ON and the main function thereof is not in operation. For example, when home appliance 40 is an air conditioner and the temperature in the room reaches a preset target temperature, the heating or the cooling automatically stops. At this time, the operating state of home appliance 40 is ON, but the main function thereof is not in operation, and therefore it is considered that the variation in the power value or the electric current value of home appliance 40 is stable. Therefore, it can be expected that the features of power or current consumption during operation of the malware affecting home appliance 40 are likely to appear in the power value or the electric current value of home appliance 40 in the stable state.

Figure 20:
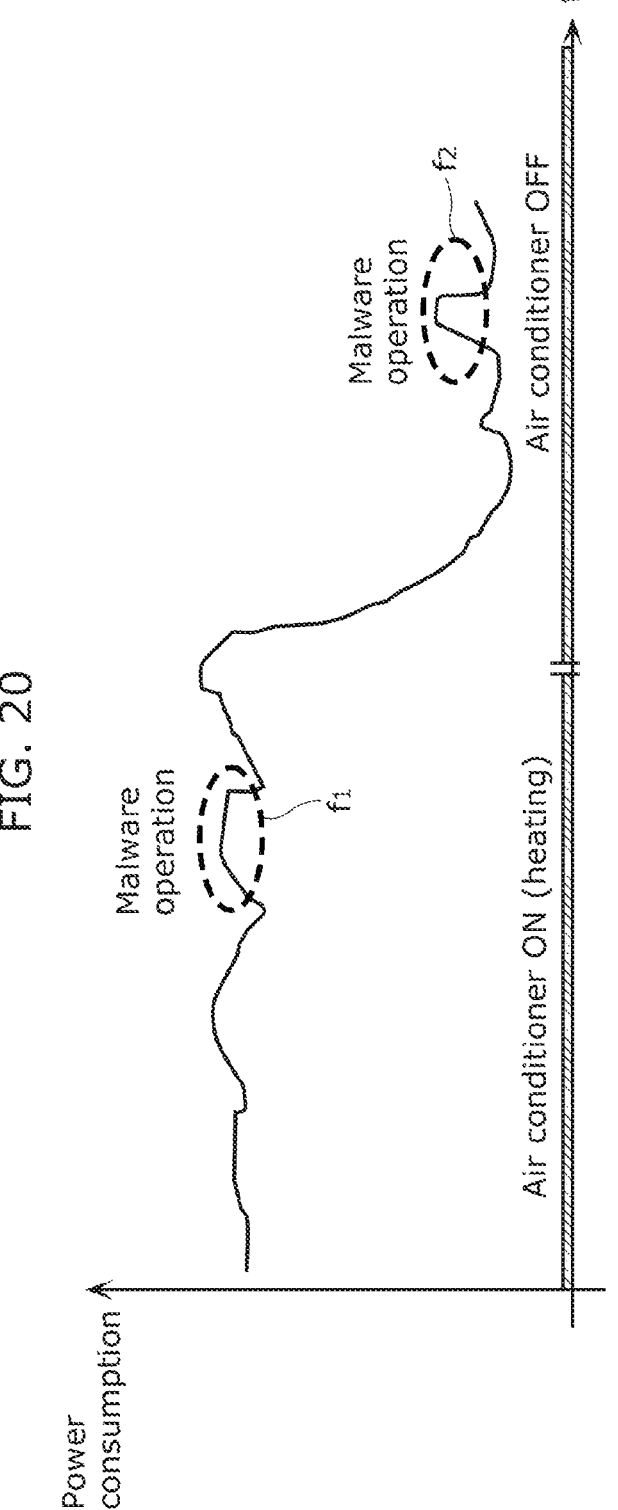
FIG. 20 is a diagram conceptually indicating that the features of power consumption during operation of malware affecting a home appliance are likely to appear in power consumption in a stable state according to Embodiment 3.

FIG. 20 is a diagram conceptually indicating that the features of power consumption during operation of malware affecting home appliance 40 are likely to appear in the power consumption in the stable state according to Embodiment 3. FIG. 20 illustrates the power consumption in the stable state when home appliance 40 is an air conditioner.

As mentioned above, in the stable state where the power consumption is high, but the variation thereof is low such as a state where the operating state of the air conditioner is ON, but the main function thereof is not in operation, the features of power consumption during operation of malware affecting home appliance are likely to appear as indicated by dotted circle f1. Similarly, in the stable state where the power consumption is low and the variation thereof is low such as a standby power state where the operating state of the air conditioner is OFF and the main function thereof is not in operation, the features of power consumption during operation of malware affecting home appliance 40 are likely to appear as indicated by dotted circle f2.

Note that whether the main function of the air conditioner is not in operation can be determined from the thermostat setting and the compressor setting described in Embodiment 2.

Referring back to FIG. 19, the discussion continues. When home appliance 40 is not in the stable state in Step S306 (No in S306), anomaly detection device 30 returns to Step S301 and performs again the process of obtaining setting values.

On the other hand, when home appliance 40 is in the stable state in Step S306 (Yes in S306), anomaly detection device 30 performs the process of selecting a detection model corresponding to the setting values of home appliance 40 (S302). The process in Step S302 has been described above and therefore, description thereof is omitted here.

[3.3 Advantageous Effects of Embodiment 3]

In Embodiments 1 and 2, one detection model corresponding the plurality of setting values that have been set on home appliance is selected from the detection model list held by detection model list holder 130. Subsequently, using the selected detection model, the malware detection (the anomaly detection) is performed to detect, from the power value or the electric current value obtained by power obtainer 160, whether home appliance 40 is infected with malware.

However, the value of electric power or current consumed during operation of some function of home appliance 40 may be great and the variation thereof may be irregular compared to the value of electric power or current consumed by malware affecting home appliance 40. In other words, there is a possibility that the features of the value of electric power or current consumed by the malware affecting home appliance 40 may be less likely to appear in the power value or the electric current value obtained during the operation of the function of home appliance 40.

In view of this, in Embodiment 3, the malware detection is performed in the stable state where there is less variation in the value of electric power or current consumed by home appliance 40. This is because it can be expected that the features of power consumption during operation of the malware affecting home appliance 40 are likely to appear in the power value or the electric current value of home appliance 40 in the stable state.

Thus, the use of the power value or the electric current value of home appliance 40 in the stable state enables more accurate detection of malware in home appliance 40.

[Other Variations]

It goes without saying that the present disclosure is not limited to the exemplary embodiments described above; forms obtained by various modifications to the exemplary embodiments that can be conceived by a person having ordinary skill in the art, and forms configured by combining structural elements in different exemplary embodiments, so long as these do not depart from the teachings of the present disclosure, are included in the scope of the present disclosure. For example, the following variations are also included in the present disclosure.

Variation 1

Embodiment 1, etc., have thus far described the setting value obtainment process in which anomaly detection device 30 requests home appliance 40 to provide the setting value and obtains the setting value included in the response to the request, but this setting value obtainment process is not limiting. For example, when the setting value is changed, home appliance 40 may notify anomaly detection device 30 of the changed setting value.

Similarly, Embodiment 1, etc., have thus far described the power obtainment process in which anomaly detection device 30 requests home appliance 40 to provide the power value or the electric current value and obtains the power value or the electric current value included in the response to the request, but this power obtainment process is not limiting. For example, when the power value or the electric current value is changed, home appliance 40 may notify anomaly detection device 30 of the changed power value or the changed electric current value.

In other words, in the present variation, when the setting value of home appliance 40 is changed, home appliance 40 transmits a setting change notification including the changed setting value to anomaly detection device 30. More specifically, using the home appliance operating protocol, home appliance 40 notifies (transmits to) anomaly detection device 30 of a plurality of setting values including one or more changed setting values. In the present variation, home appliance 40 transmits, at fixed intervals, the setting change notification including the power value or the electric current value of home appliance 40.

Figure 21:
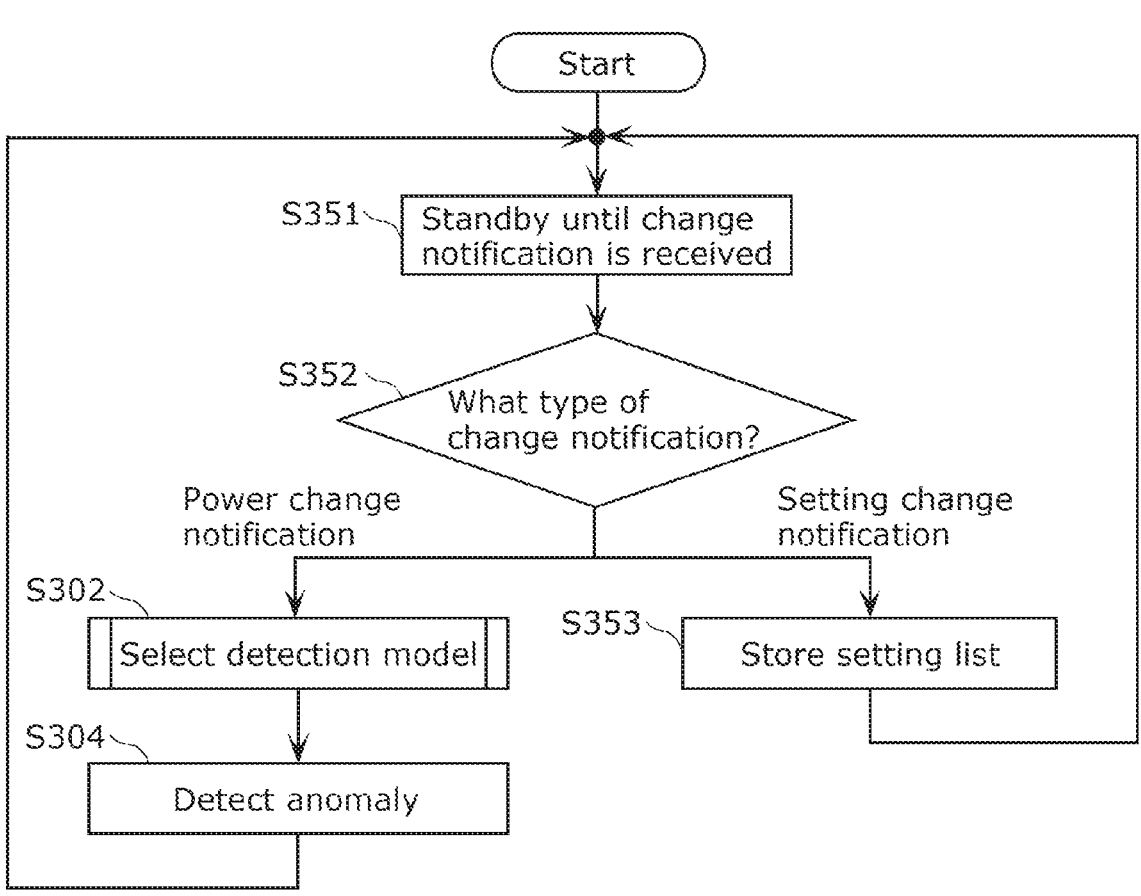
FIG. 21 is a flowchart illustrating one example of a main process performed by an anomaly detection device according to Variation 1.

FIG. 21 is a flowchart illustrating one example of the main process performed by anomaly detection device 30 according to Variation 1. Elements that are substantially the same as those illustrated in FIG. 14 are assigned the same reference signs and detailed description thereof will be omitted.

In FIG. 21, first, anomaly detection device 30 is standby until anomaly detection device 30 receives a change notification from home appliance 40 (S351).

Next, when anomaly detection device 30 receives a change notification from home appliance 40, anomaly detection device 30 determines the type of the change notification received (S352).

When the type of the change notification received is a power change notification in Step S352 (a power change notification in S352), anomaly detection device 30 performs the process of selecting a detection model corresponding to the setting values of home appliance 40 (S302).

Next, anomaly detection device 30 performs anomaly detection (S304). Subsequently, after performing the anomaly detection, anomaly detection device 30 returns to Step S351 and is standby until anomaly detection device 30 receives a change notification.

On the other hand, when the type of the change notification received is a setting change notification in S352 (a setting change notification in S352), anomaly detection device 30 stores the plurality of setting values included in the setting change notification into setting list holder 110 as a setting list (S353). Subsequently, anomaly detection device 30 returns to Step S351 and is standby until anomaly detection device 30 receives a change notification.

Variation 2

Embodiment 1, etc., have thus far described the case where server 50 is connected to Internet 10, but this is not limiting. For example, a terminal of a user of air conditioner 40a and security information and event management (SIEM) may be connected to Internet 10.

Figure 22:
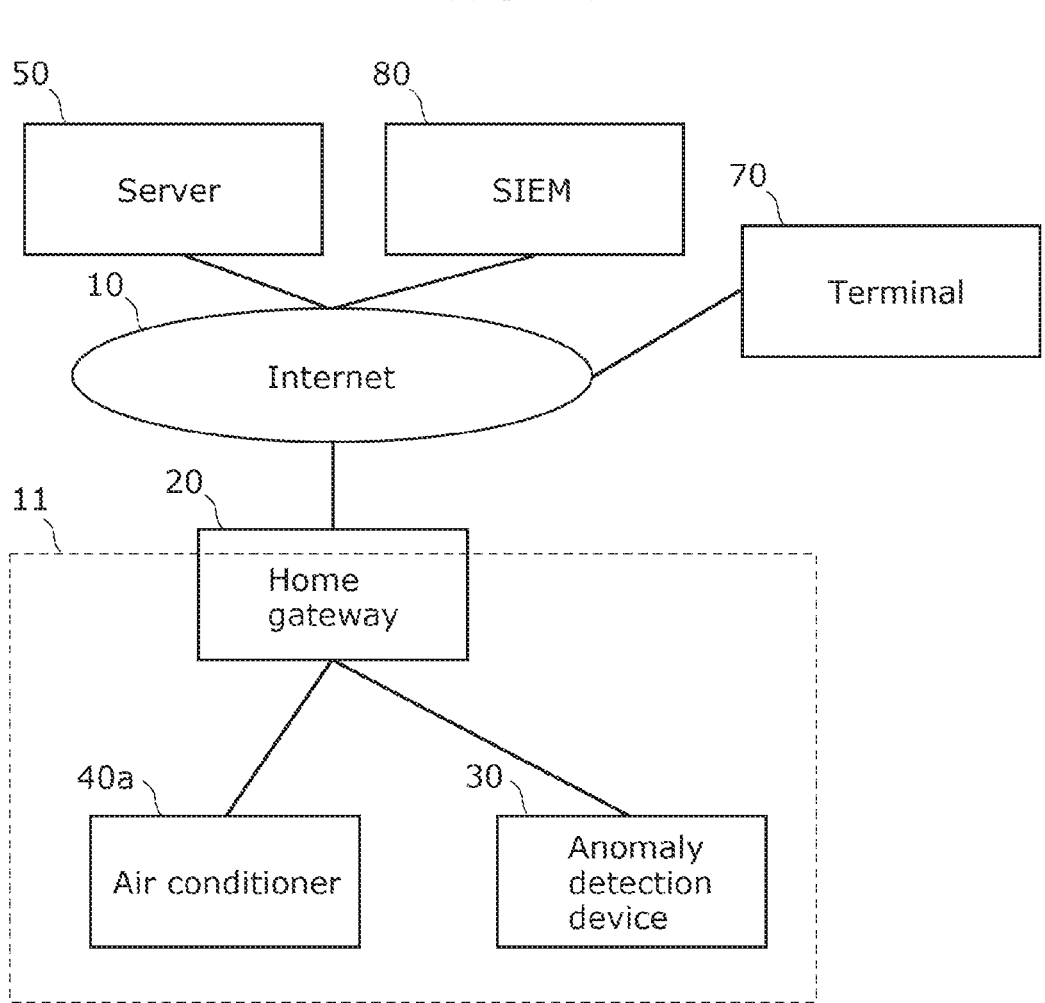
FIG. 22 is a diagram illustrating the overall configuration of a malware detection system according to Variation 2.

FIG. 22 is a diagram illustrating the overall configuration of a malware detection system according to Variation 2. Elements that are substantially the same as those illustrated in FIG. 1 and FIG. 16 are assigned the same reference signs and detailed description thereof will be omitted.

The malware detection system illustrated in FIG. 22 is different from the malware detection system illustrated in FIG. 16 in that terminal 70 and SIEM 80 are further connected to Internet 10.

Air conditioner 40a is one example of home appliance 40. Terminal 70 is, for example, a terminal used by a user of air conditioner 40a such as a smartphone, a tablet, or a personal computer. The user is, for example, a resident or the like who occupies a space where home gateway 20, anomaly detection device 30, and air conditioner 40a are installed. SIEM 80 is a device for combining and analyzing a plurality of anomaly detection devices including anomaly detection device 30 illustrated in FIG. 22.

When anomaly detector 150 of anomaly detection device 30 detects that air conditioner 40a is infected with malware, anomaly detector 150 may notify terminal 70 to that effect.

Figure 23A:
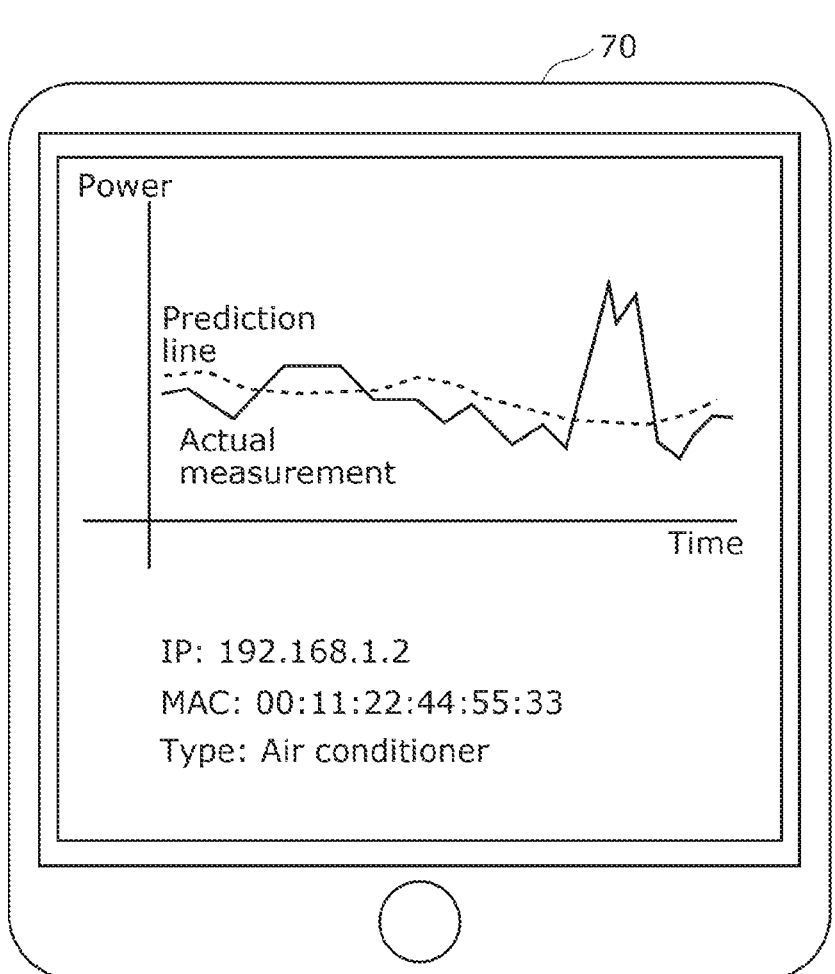
FIG. 23A is a diagram illustrating one example of a display screen of a terminal according to Variation 2.
Figure 23B:
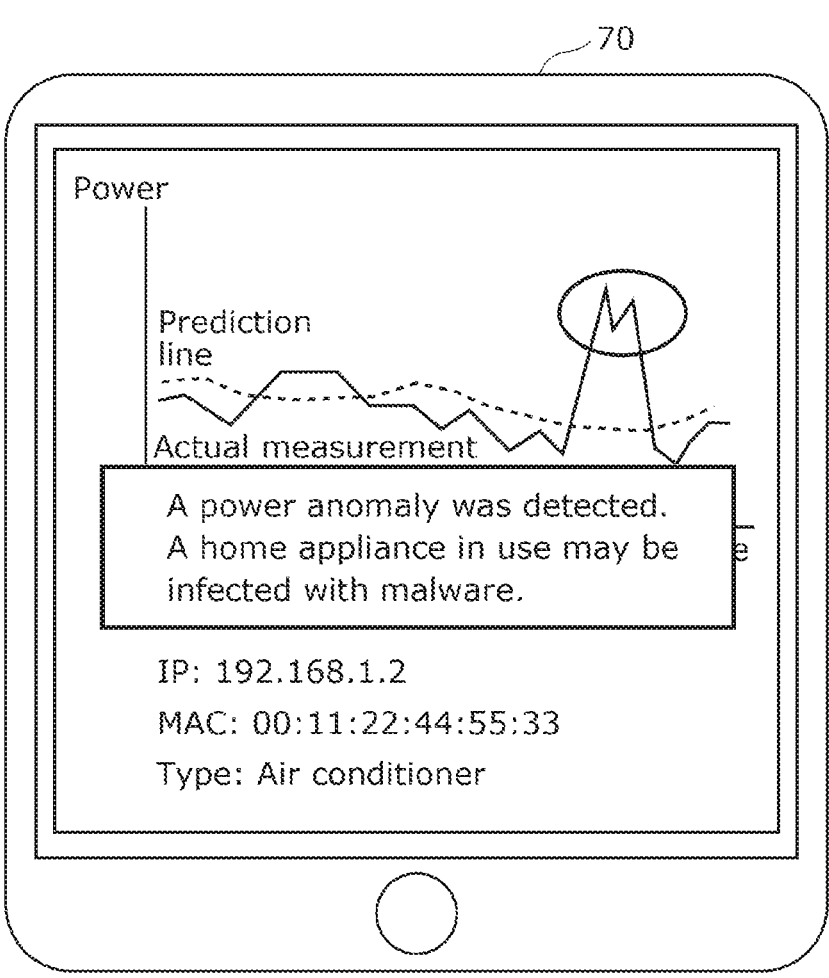
FIG. 23B is a diagram illustrating one example of a display screen of a terminal according to Variation 2.

FIG. 23A and FIG. 23B are diagrams each illustrating one example of a display screen of terminal 70 according to Variation 2. FIG. 23A illustrates one example of the display screen of terminal 70 displayed when air conditioner 40a is not infected with malware. FIG. 23B illustrates one example of the display screen of terminal 70 displayed when air conditioner 40a is infected with malware.

In the example illustrated in FIG. 23A, the power value of air conditioner 40a is displayed on the display screen of terminal 70. In the example illustrated in FIG. 23B, when it is notified that air conditioner 40a is infected with malware, the display screen of terminal 70 shows the fact of having been infected with malware.

Furthermore, when anomaly detector 150 of anomaly detection device 30 detects that air conditioner 40a is infected with malware, anomaly detector 150 may notify SIEM 80 to that effect.

Figure 24:
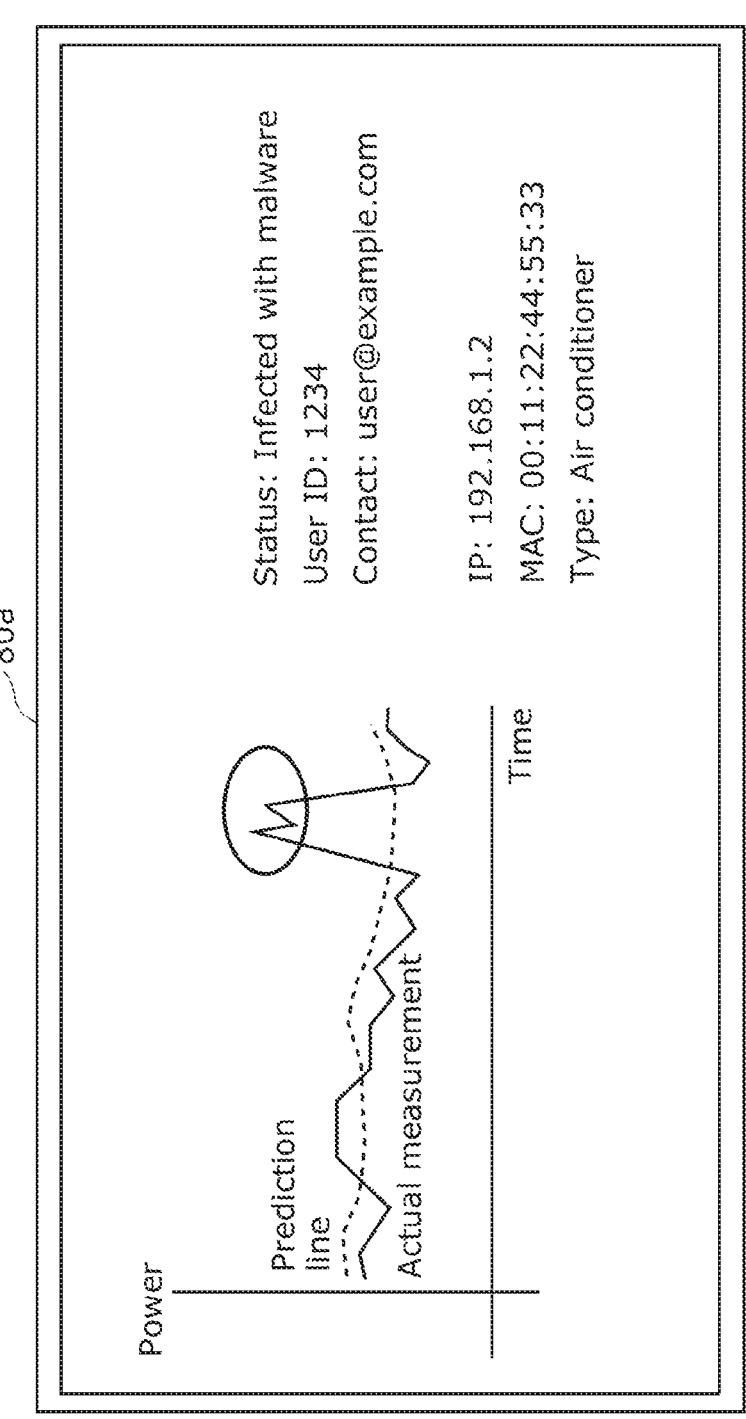
FIG. 24 is a diagram illustrating one example of a display screen of SIEM according to Variation 2.

FIG. 24 is a diagram illustrating one example of display screen 80a of SIEM 80 according to Variation 2. FIG. 24 illustrates one example of display screen 80a of SIEM 80 displayed when air conditioner 40a is infected with malware. In the region enclosed by a circle on display screen 80a illustrated in FIG. 24, the features of power consumption during operation of malware appears in the power value of air conditioner 40a.

Variation 3

Embodiment 1, etc., have thus far described the case where as the setting value obtainment process, anomaly detection device 30 detects whether one home appliance 40 is infected with malware, but this is not limiting. A target device subject to malware detection on which anomaly detection device 30 performs the malware detection is not limited to one home appliance 40. The target device may be more than one home appliance.

Figure 25:
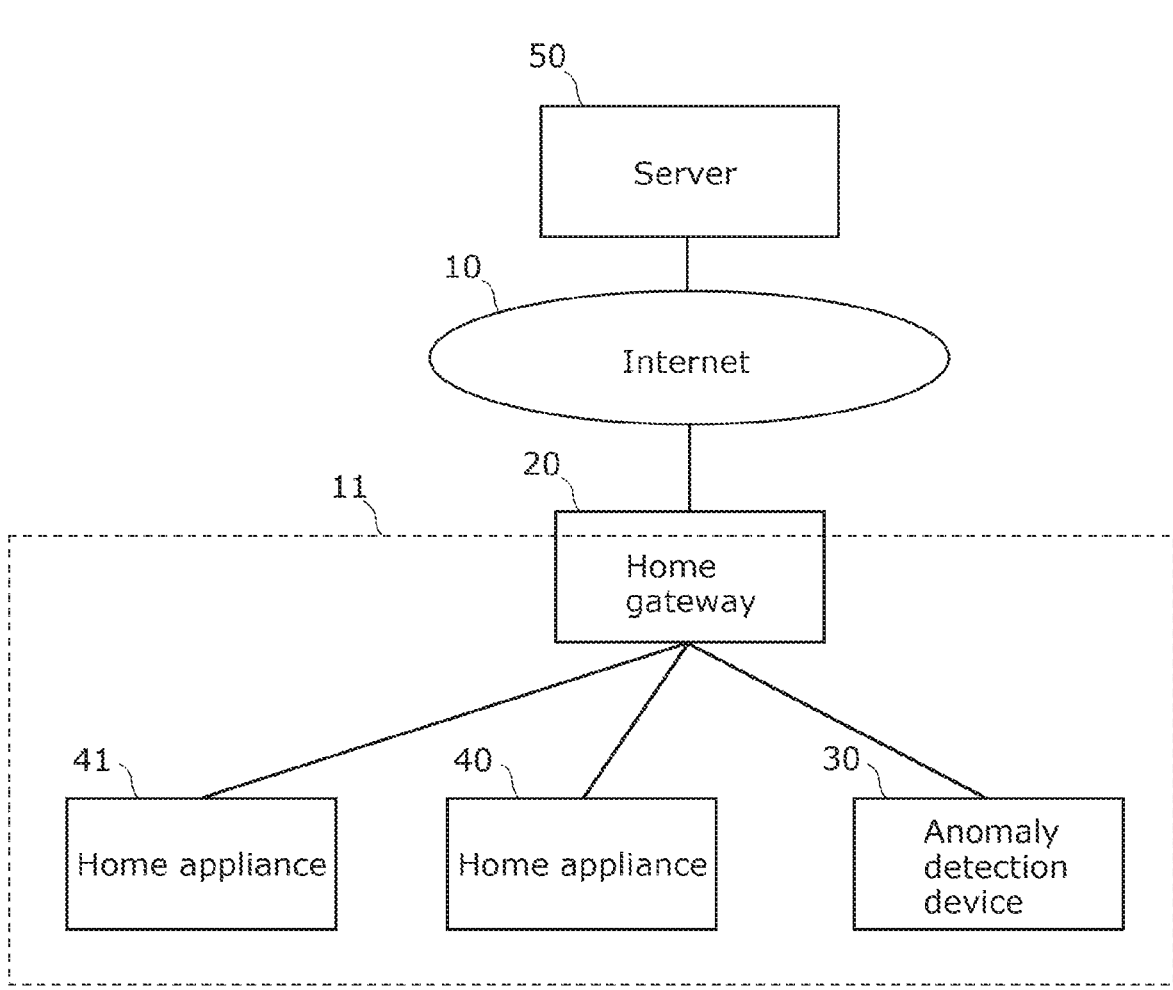
FIG. 25 is a diagram illustrating the overall configuration of a malware detection system according to Variation 3.

FIG. 25 is a diagram illustrating the overall configuration of a malware detection system according to Variation 3. Elements that are substantially the same as those illustrated in FIG. 1 are assigned the same reference signs and detailed description thereof will be omitted.

The configuration of the malware detection system illustrated in FIG. 25 is different from the configuration of the malware detection system illustrated in FIG. 1 in that in addition to home appliance 40, home appliance 41 is connected to home network 11.

[4.1 Anomaly Detection Device 30]

In the present variation, anomaly detection device 30 may perform the malware detection on both of home appliance 40 and home appliance 41 or may perform the malware detection on one of home appliance 40 and home appliance 41.

When the IP addresses of home appliance 40 and home appliance 41 are known in advance, setting obtainer 100 of anomaly detection device 30 may obtain the plurality of setting values of each of home appliance 40 and home appliance 41 using the home appliance operating protocol.

Note that when the IP addresses of home appliance 40 and home appliance 41 are not known in advance and all home appliances 40, 41 connected to home network 11 are target devices subject to malware detection, it is sufficient that setting obtainer 100 detect the IP addresses of home appliance 40 and home appliance 41. Subsequently, setting obtainer 100 only needs to obtain the plurality of setting values of each of home appliance 40 and home appliance 41 on the basis of the detected IP addresses using the home appliance operating protocol.

Examples of a method for detecting the IP addresses of home appliance 40 and home appliance 41 include a method in which the home appliance detection function of the home appliance operating protocol is used, a method in which multicast or broadcast is used, and a method in which the IP addresses are detected from packets of DHCP or the like.

In the method in which multicast or broadcast is used, setting obtainer 100 transmits packets of ICMP Echo or the like using multicast or broadcast or transmits packets of ICMP Echo or the like to all IP addresses within home network 11. Subsequently, it is sufficient that setting obtainer 100 detect the IP addresses of home appliance 40 and home appliance 41 from the source IP addresses in the IP headers of response packets returned by home appliance 40 and home appliance 41 in response to the packets transmitted. In the method in which the IP addresses are detected from packets of DHCP or the like, it is sufficient that setting obtainer 100 detect the IP addresses from packets of DHCP or the like that have been transmitted by home appliance 40, home appliance 41, and the like at the time of participating in home network 11.

Note that the IP addresses of home appliance 40 and home appliance 41 may be detected at predetermined intervals or may be detected every time there is a need to obtain the setting values of each of home appliance 40 and home appliance 41. Furthermore, the IP addresses of home appliance 40 and home appliance 41 may be detected when anomaly detection device 30 is installed in home network 11 or may be detected when anomaly detection device 30 is activated.

Furthermore, setting obtainer 100 may obtain the setting values of the device types and the model numbers of home appliance and home appliance 41 at a time different from the time of obtaining the other setting values. This is because it is conceivable that the device types and the model numbers of home appliance 40 and home appliance 41 are changed less frequently than the other setting values. For example, setting obtainer 100 may set the frequency of obtaining the device types and the model numbers of home appliance 40 and home appliance 41 less than the frequency of obtaining the other setting values or may obtain the device types and the model numbers only when the IP addresses of home appliance 40 and home appliance 41 are detected.

The following describes the case where anomaly detection device 30 performs the malware detection on one or more home appliances, namely, home appliance 40 and home appliance 41.

[4.2 Main Process Performed by Anomaly Detection Device 30]

FIG. 26 is a flowchart illustrating one example of the main process performed by anomaly detection device 30 according to Variation 3.

In FIG. 26, first, when performing the malware detection on a plurality of home appliances that are target devices subject to malware detection, anomaly detection device 30 divides the processing into branches of thread 1 and thread 2 (S361).

In the processes of thread 1, anomaly detection device 30 allocates a thread to each home appliance that is a target device subject to malware detection (S362).

In each thread allocated, anomaly detection device 30 performs the process of selecting a detection model (the detection model selection process) (S363). The detection model selection process for each home appliance that is a target device subject to malware detection in each thread is as described in Step S302 in FIG. 14 and thus, description thereof will be omitted.

Next, anomaly detection device 30 performs the process of obtaining, using the home appliance operating protocol, a power value or an electric current value of a home appliance that is a target device subject to malware detection in each thread (the power obtainment process) (S364). The power obtainment process for the home appliance that is a target device subject to malware detection in each thread is as described in Step S303 in FIG. 14 and thus, description thereof will be omitted.

Next, using the detection model associated with the settings of the home appliance that is a target device subject to malware detection in each thread, anomaly detection device 30 detects whether the home appliance that is a target device subject to malware detection in the thread is infected with malware (S365). The process of detecting whether the home appliance that is a target device subject to malware detection in each thread is infected with malware is as described in Step S304 in FIG. 14 and thus, description thereof will be omitted.

Next, anomaly detection device 30 determines whether the current time is a timing (a detection model selection timing) at which a detection model for the home appliance that is a target device subject to malware detection in each thread is to be selected (S366). More specifically, anomaly detection device 30 determines whether a predetermined length of time has elapsed since the last detection model selection timing.

When it is determined in Step S366 that the current time is the detection model selection timing (Yes in S366), anomaly detection device 30 returns to Step S363 and performs the detection model selection process. Here, when the predetermined length of time has elapsed since the last detection model selection timing, anomaly detection device 30 can determine that the current time is the detection model selection timing.

On the other hand, when it is determined in Step S366 that the current time is not the detection model selection timing (No in S366), anomaly detection device 30 returns to Step S364 and performs the power obtainment process. Here, when the predetermined length of time has not elapsed since the last detection model selection timing, anomaly detection device 30 can determine that the current time is not the detection model selection timing.

Meanwhile, in the processes of thread 2, anomaly detection device 30 performs the process of obtaining the setting values of each of the plurality of home appliances that are target devices subject to malware detection (the setting value obtainment process) (S367). The setting value obtainment process for each of the plurality of home appliances is as described in Step S301 in FIG. 14 and thus, description thereof will be omitted.

Next, when a predetermined length of time elapses (S368), anomaly detection device 30 returns to Step S367 and performs the setting value obtainment process of obtaining the setting values of each of the plurality of home appliances that are target devices subject to malware detection.

Note that the process in S361 is not limited to the threads; for example, processes or the like may be used to enable parallel execution.

Furthermore, when the target device subject to malware detection for anomaly detection device 30 is not set in advance, anomaly detection device 30 may detect, using multicast or broadcast according to the home appliance operating protocol, a plurality of home appliances that are located within home network 11. In this case, anomaly detection device 30 may regard, as the target devices, the plurality of home appliances that have been detected.

For example, assume that the home appliance operating protocol is ECHONET Lite. In this case, when anomaly detection device 30 transmits a device search packet using multicast, each of the plurality of home appliances located within home network 11 returns an ECHONET Lite packet. Therefore, anomaly detection device 30 may obtain a source IP address from the ECHONET Lite packet returned in response to the device search packet transmitted and regard the obtained source IP address as the IP address of a home appliance that is a target device subject to malware detection.

[4.2.1 Main Process Performed when Target Devices Subject to Malware Detection are Home Appliance 40 and Home Appliance 41]

With reference to FIG. 26, the following describes the main process performed when the plurality of home appliances that are target devices subject to malware detection are home appliance 40 and home appliance 41.

First, when performing the malware detection on home appliance 40 and home appliance 41 that are target devices subject to malware detection, anomaly detection device 30 divides the processing into branches of thread 1 and thread 2 (S361).

In the processes of thread 1, anomaly detection device 30 allocates a first thread to home appliance 40 and a second thread to home appliance 41 (S362).

In the first thread, anomaly detection device 30 performs the detection model selection process on home appliance 40 (S363), performs the power obtainment process on home appliance 40 using the home appliance operating protocol (S364), and detects whether home appliance 40 is infected with malware (S365).

Similarly, in the second thread, anomaly detection device 30 performs the detection model selection process on home appliance 41 (S363), performs the power obtainment process on home appliance 41 using the home appliance operating protocol (S364), and detects whether home appliance 41 is infected with malware (S365).

In the processes of thread 2, anomaly detection device 30 performs the setting value obtainment process on each of home appliance 40 and home appliance 41 that are target devices subject to malware detection (S367). Accordingly, the setting list held by setting list holder 110 of anomaly detection device 30 is updated. Note that the setting list held by setting list holder 110 of anomaly detection device 30 is referred to in Step S363 in the processes of thread 1. Therefore, it is necessary to properly perform excusive processes in thread 1 and thread 2.

FIG. 27 is a diagram illustrating one example of the setting list held by setting list holder 110 according to Variation 3. Assume that the setting list illustrated in FIG. 27 holds the settings of home appliance 40 in No. 1 and holds the settings of home appliance 41 in No. 2.

In this case, No. 1 of the setting list indicates the setting values of home appliance 40 in which the IP address is xx.xx.xx.xx, the device type is an air conditioner, the model number is AB-XB-1, and the operating state is ON. No. 2 of the setting list indicates the setting values of home appliance 41 in which the IP address is yy.yy.yy.yy, the device type is a television set, the model number is DE-XE-1, and the operating state is ON.

FIG. 28 illustrates another example of the setting list held by setting list holder 110 according to Variation 3. In the example illustrated in FIG. 28, the setting list also holds the settings of home appliance 40 in No. 1 and holds the settings of home appliance 41 in No. 2.

No. 1 of the setting list illustrated in FIG. 28 indicates the setting values of home appliance 40 that are the same as those indicated in FIG. 27 in which the IP address is xx.xx.xx.xx, the device type is an air conditioner, the model number is AB-XB-1, and the operating state is ON. No. 1 of the setting list illustrated in FIG. 28 further indicates the setting values of home appliance 40 in which the mode is heating, the power saving setting is ON, the fan speed setting is 3, the thermostat setting is ON, and the compressor setting is ON.

Similarly, No. 2 of the setting list illustrated in FIG. 28 indicates the setting values of home appliance 41 that are the same as those indicated in FIG. 27 in which the IP address is yy.yy.yy.yy, the device type is a television set, the model number is DE-XE-1, and the operating state is ON. Note that home appliance 41 whose device type is a television set does not have the setting values of the mode, the power saving setting, the fan speed setting, the thermostat setting, and the compressor setting; thus, these setting values are indicated as undefined in No. 2 of the setting list illustrated in FIG. 28.

In the present variation, in the first thread allocated to home appliance 40 in Step S362, one detection model is selected from the detection model list held by detection model list holder 130 of anomaly detection device 30. Similarly, in the second thread allocated to home appliance 41 in Step S362, one detection model is selected from the detection model list held by detection model list holder 130 of anomaly detection device 30. The detection model selected for each of home appliance 40 and home appliance 41 is occasionally updated and referred to, and therefore it is necessary to properly perform excusive processes in the threads.

FIG. 29 is a diagram illustrating one example of a plurality of detection models included in the detection model list held by detection model list holder 130 according to Variation 3.

In the example illustrated in FIG. 29, the detection model list held by detection model list holder 130 includes four detection models, namely, detection model 1 to detection model 4. For example, the detection model list holds, in No. 1 and No. 2, detection model 1 and detection model 2 associated with the settings of home appliance 40 in which the device type is an air conditioner and the model number is AB-XB-1, for example. The detection model list holds, in No. 3 and No. 4, detection model 3 and detection model 4 associated with the settings of home appliance 41 in which the device type is a television set and the model number is DE-XE-1.

Detection model 1 is a detection model to be applied when the operating state of home appliance 40 whose device type is an air conditioner and whose model number is AB-XB-1 is ON. Detection model 2 is a detection model to be applied when the operating state of home appliance 40 whose device type is an air conditioner and whose model number is AB-XB-1 is OFF.

Similarly, detection model 3 is a detection model to be applied when the operating state of home appliance 41 whose device type is a television set and whose model number is DE-XE-1 is ON. Similarly, detection model 4 is a detection model to be applied when the operating state of home appliance 41 whose device type is a television set and whose model number is DE-XE-1 is OFF.

FIG. 30 is a diagram illustrating another example of the plurality of detection models included in the detection model list held by detection model list holder 130 according to Variation 3. Note that detection models that are the same as those indicated in FIG. 29 are assigned the same names.

In the example illustrated in FIG. 30, the detection model list held by detection model list holder 130 includes six detection models, namely, detection model 2 to detection model 7. For example, the detection model list holds, in No. 1 to No. 4, detection models 5 to 7 and detection model 2 associated with the settings of home appliance in which the device type is an air conditioner and the model number is AB-XB-1, for example. The detection model list holds, in No. 5 and No. 6, detection model 3 and detection model 4 associated with the settings of home appliance 41 in which the device type is a television set and the model number is DE-XE-1.

Detection model 5 is a detection model to be applied when the operating state of home appliance 40 whose device type is an air conditioner and whose model number is AB-XB-1 is ON, the mode thereof is heating, the fan speed setting thereof is 1, the thermostat setting is ON, and the compressor setting is ON. Detection model 6 is a detection model to be applied when the operating state of home appliance 40 is ON, the mode thereof is heating, the fan speed setting thereof is 1, the thermostat setting is ON, and the compressor setting is OFF. Detection model 7 is a detection model to be applied when the operating state of home appliance 40 is ON, the mode thereof is heating, the fan speed setting thereof is 1, the thermostat setting is OFF, and the compressor setting is ON.

Note that detection model 2 corresponds to detection model 2 indicated in FIG. 29 and is a detection model to be applied when the operating state of home appliance 40 is OFF while the mode, the power saving setting, the fan speed setting, the thermostat setting, and the compressor setting are indicated as undefined.

Detection model 3 and detection model 4 correspond to detection model 3 and detection model 4 indicated in FIG. 29. In detection model 3 and detection model 4 for home appliance 41 whose device type is a television set and whose model number is DE-XE-1, the mode, the power saving setting, the fan speed setting, the thermostat setting, and the compressor setting are indicated as undefined.

Variation 4

In the above-described exemplary embodiments, etc., a value indicating whether home appliance 40 is infected with malware is output when the power value or the electric current value of home appliance 40 is input to the detection model for malware detection, but this is not limiting. In addition to the power value or the electric current value of home appliance 40, the setting values of another home appliance installed or located in the same room as home appliance 40 may be input to the detection model for malware detection so that a value indicating whether home appliance 40 is infected with malware is output.

Figure 31:
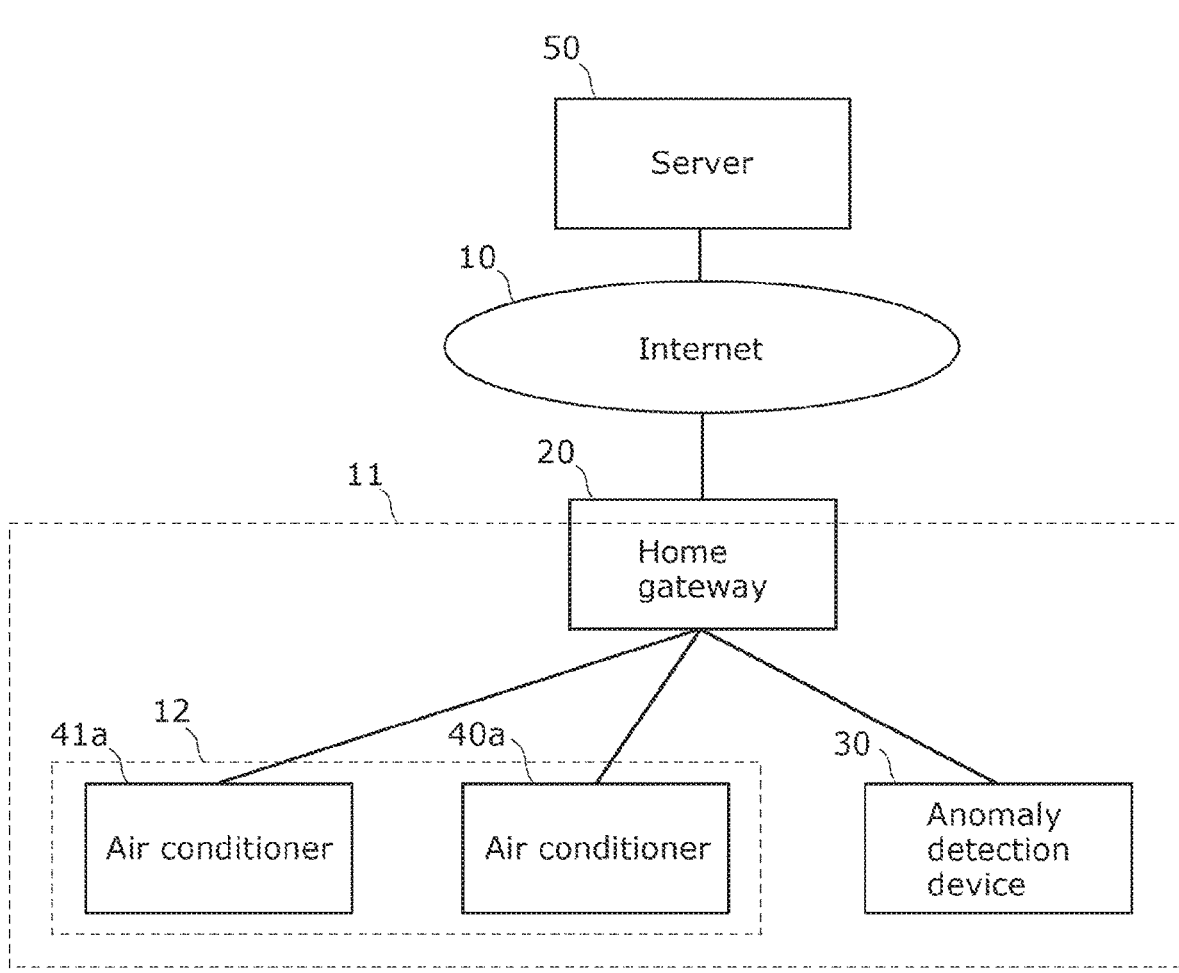
FIG. 31 is a diagram illustrating the overall configuration of a malware detection system according to Variation 4.

FIG. 31 is a diagram illustrating the overall configuration of a malware detection system according to Variation 4. Elements that are substantially the same as those illustrated in FIG. 1, FIG. 16, etc., are assigned the same reference signs.

The malware detection system illustrated in FIG. 31 is different from the malware detection system illustrated in FIG. 16 in that air conditioner 41a different from air conditioner 40a is installed in same room 12 where air conditioner 40a is installed. This means that air conditioner 40a and air conditioner 41a are located in same room 12.

Air conditioner 41a is a home appliance that is connected to home network 11 and is in compliance with the home appliance operating protocol. Air conditioner 41a, which is different from air conditioner 40a, is installed and thus is located in same room 12 which is a space where air conditioner 40a is installed. Similar to air conditioner 40a, air conditioner 41a is connected to home gateway 20.

There will be not a small difference between the power value or the electric current value measured when air conditioner 40a is operating alone in the heating mode and the power value or the electric current value measured when air conditioner 40a and air conditioner 41a are located in the same room and both of the air conditioners are operating in the heating mode, for example.

Therefore, in the present variation, a detection model is selected that corresponds to indoor information indicating, for example, that air conditioner 40a and air conditioner 41a are located in the same room. Subsequently, the setting values of air conditioner 40a including, in addition to the power value of air conditioner 40a, an operating state indicating whether air conditioner 41a is operating are input to the selected detection model, and thus the malware detection for air conditioner 40a is performed.

Note that even when air conditioner 40a is operating alone, the power value or the electric current value for reaching a target temperature varies depending on spatial features such as a thermal insulation structure included in the space where air conditioner 40a is installed. Therefore, in the present variation, a detection model may be selected that corresponds to indoor information indicating, for example, features of the space where air conditioner 40a is installed.

More specifically, anomaly detection device 30 according to the present variation may obtain, from server 50, a detection model list including a plurality of detection models corresponding to the indoor information. Here, when the target device is an air conditioner, the indoor information may be information indicating whether there are one or more air conditioners other than the target device in the space where the target device is installed. Furthermore, when the target device is an air conditioner, the indoor information may be information indicating whether the space where the target device is installed includes a thermal insulation structure.

Subsequently, it is sufficient that anomaly detection device 30 according to the present variation separately select one detection model from the detection model list according to the plurality of setting values of the target device such as air conditioner 40a that have been obtained.

In this manner, using the detection model selected in consideration of the indoor information, the malware detection is performed on the target device that is air conditioner 40a or the like; thus, it is expected that the accuracy of detecting malware will improve.

Note that air conditioner 40a and air conditioner 41a are not required to have been installed in the same space, that is, the same room, as long as these have impact on each other in terms of the power value and the electric current value during operation, and it is only required that a detection model list reflecting the impact on the power value and the electric current value can be selected.

Variation 5

In the above-described exemplary embodiments and variations, the malware detection method and the malware detection device according to the present disclosure have been described thus far as being usable as security measures for cyber-physical systems that cover home appliances, but the range of application thereof is not limited to that described above. The malware detection method and the malware detection device according to the present disclosure may be further applied to a user interface (UI) for visualizing attacks on home appliances, and the range of application thereof is not limited to this example.

Note that the target devices for the malware detection method and the malware detection device according to the present disclosure are not limited to home appliances. The target devices can be applied to mobile vehicles such as construction equipment, farm equipment, ships, trains, and airplanes, for example. Furthermore, the target devices can also be applied to communication networks for use in industrial control systems of factories, buildings, and the like, and communication networks for controlling embedded devices, for example.

Furthermore, the malware detection method and the malware detection device according to the present disclosure can also be applied when the results of determination and output in each process of security functions are displayed as a user interface (UI) for visualizing attacks in cyber-physical systems.

Other Embodiment Possibilities

While the malware detection method and the malware detection device according to the present disclosure have been described thus far in the exemplary embodiments, subjects, devices, and the like for the processes are not limited to specific ones. The processes may be performed using processors, etc., embedded in specific, locally positioned devices. Alternatively, the processes may be performed using cloud servers, etc., placed at locations different from where local devices are placed.

Note that the present disclosure is not limited to the above-described exemplary embodiments and variations. For example, other exemplary embodiments that can be realized by arbitrarily combining or removing structural elements described in the present specification may also be exemplary embodiments of the present disclosure. Furthermore, variations obtainable through various changes to the above-described exemplary embodiments that can be conceived by a person having ordinary skill in the art without departing from the essence of the present disclosure, that is, the meaning of the recitations in the claims, are also included in the present disclosure.

Furthermore, the present disclosure includes the following cases.

(1) The above-described device is specifically a computer system configured from a microprocessor, a read only memory (ROM), a random access memory (RAM), a hard disk unit, a display unit, a keyboard, and a mouse, for example. A computer program is stored in the RAM or the hard disk unit. Each device achieves its function as a result of the microprocessor operating according to the computer program. Here, the computer program is configured of a combination of command codes indicating instructions to the computer in order to achieve a predetermined function.

(2) Some or all of the structural elements included in the above-described device may be configured from a single system Large Scale Integration (LSI). A system LSI is a super-multifunction LSI manufactured with a plurality of components integrated on a single chip, and is specifically a computer system configured of a microprocessor, ROM, and RAM, for example. A computer program is stored in the RAM. The system LSI achieves its function as a result of the microprocessor operating according to the computer program.

(3) Some or all of the structural elements included in the above-described device may each be configured from an IC card that is detachably attached to each device or a standalone module. The IC card or the module is a computer system made up of a microprocessor, ROM, RAM, and so on. The IC card or the module may include the aforementioned super multifunctional LSI. The IC card and the module achieve their functions as a result of the microprocessor operating according to the computer program. The IC card and the module may be tamperproof.

(4) Moreover, the present disclosure may be the method described above. Furthermore, the present disclosure may be a computer program for implementing these methods using a computer or may be a digital signal of the computer program.

(5) Moreover, the present disclosure may be the aforementioned computer program or digital signal recorded on recording media readable by a computer, such as a flexible disk, a hard disk, a compact disc read-only memory (CD-ROM), a magneto-optical disc (MO), a digital versatile disc (DVD), a DVD-ROM, a DVD-RAM, a Blu-ray (registered trademark) disc (BD), or a semiconductor memory, for example. The present disclosure may also be the digital signal recorded on these recoding media.

Furthermore, the present disclosure may be the aforementioned computer program or digital signal transmitted via a telecommunication line, a wireless or wired communication line, a network represented by the Internet, data broadcasting, or the like.

Furthermore, the present disclosure may be a computer system including a microprocessor and a memory. The memory may have the computer program stored therein, and the microprocessor may operate according to the computer program.

Moreover, by transferring the recording medium having the aforementioned program or digital signal recorded thereon or by transferring the aforementioned program or digital signal via the aforementioned network or the like, the present disclosure may be implemented by a different independent computer system.

INDUSTRIAL APPLICABILITY

The present disclosure enables flexible determination on unauthorized control on electric locks, housing equipment, home appliances, etc., according to the states of residents, the states of the home appliances operating indoors (inside houses), etc. Furthermore, the present disclosure can be used to detect unauthorized communication with devices connected to local networks of buildings, stores, factories, vehicles, or the like that are connected to the Internet via devices such as routers.

The invention claimed is:

1. A malware detection method for a home network system including one or more home appliances that are connected to a home network and that include a target home appliance subjected to malware detection, the malware detection method comprising:

obtaining a plurality of setting values including at least information indicating a device type and an operating state of the target home appliance;

implementing one model out of a plurality of models according to the plurality of setting values obtained in the obtaining of the plurality of setting values;

obtaining power consumption or current consumption of the target home appliance;

executing the one model to determine whether the target home appliance is infected with malware based on the power consumption or the current consumption as obtained from the obtaining of the power consumption or the current consumption, wherein the target home appliance is infected with malware when the power consumption or the current consumption shows an active stable usage of power or current within a predetermined range when the target home appliance is in a stable state; and outputting a value indicating whether the target home appliance is infected with malware, the value being obtained by inputting the power consumption or the current consumption into the one model.

2. The malware detection method according to claim 1, wherein the operating state includes an active operating state.

3. The malware detection method according to claim 1, wherein when the target home appliance is an air conditioner, the plurality of setting values obtained in the obtaining of the plurality of setting values further include information indicating whether the target home appliance is operating in a heating mode or a cooling mode.

4. The malware detection method according to claim 3, wherein when the target home appliance is an air conditioner, the plurality of setting values obtained in the obtaining of the plurality of setting values further include:

information indicating whether the target home appliance is in a defrosting state, information indicating whether the target home appliance is in a residual heat state, information indicating whether the target home appliance is in a heat removal state, information indicating whether a compressor of the target home appliance is operating, or information indicating whether a thermostat of the target home appliance is operating.

5. The malware detection method according to claim 3, wherein when the target home appliance is an air conditioner, the plurality of setting values obtained in the obtaining of the plurality of setting values further include:

information indicating a fan speed of the target home appliance; or information indicating whether a power saving setting of the target home appliance is ON.

6. The malware detection method according to claim 1, wherein in the obtaining of the plurality of setting values, the plurality of setting values are obtained using a home appliance operating protocol, and in the obtaining of the power consumption or the current consumption, the power consumption or the current consumption of the target home appliance is obtained using the home appliance operating protocol.

7. The malware detection method according to claim 1, wherein the implementing includes:

obtaining, from a server, a model list including the plurality of models corresponding to indoor information; and implementing the one model out of the model list according to the plurality of setting values obtained in the obtaining of the plurality of setting values.

8. The malware detection method according to claim 7, wherein when the target home appliance is an air conditioner, the indoor information is information indicating whether one or more air conditioners other than the target home appliance are present in a space where the target home appliance is installed.

9. The malware detection method according to claim 7, wherein when the target home appliance is an air conditioner, the indoor information is information indicating whether a space where the target home appliance is installed includes a thermal insulation structure.

10. A malware detection device for a home network system including one or more home appliances that are connected to a home network and that include a target home appliance subjected to malware detection, the malware detection device comprising:

a processor; and a memory, wherein when using the memory, the processor operates as a setting value obtainer that obtains a plurality of setting values including at least information indicating a device type and an operating state of the target home appliance;

a model implementer that implements one model out of a plurality of models according to the plurality of setting values obtained by the setting value obtainer;

a power consumption obtainer that obtains power consumption or current consumption of the target home appliance;

malware determiner that determines whether the target home appliance is infected with malware based on the power consumption or the current consumption as obtained from the power consumption obtainer, wherein the target home appliance is infected with malware when the power consumption or the current consumption shows an active stable usage of power or current within a predetermined range when the target home appliance is in a stable state; and an outputter that outputs a value indicating whether the target home appliance is infected with malware, the value being obtained by inputting the power consumption or the current consumption into the one model.

11. A non-transitory computer-readable recording medium having recorded thereon a program for performing a malware detection method for a home network system including one or more home appliances that are connected to a home network and that include a target home appliance subject to malware detection, the program being for executing:

obtaining a plurality of setting values including at least information indicating a device type and an operating state of the target home appliance;

implementing one model out of a plurality of models according to the plurality of setting values obtained in the obtaining of the plurality of setting values;

obtaining power consumption or current consumption of the target home appliance;

executing the one model to determine whether the target home appliance is infected with malware based on the power consumption or the current consumption as obtained from the obtaining of the power consumption or the current consumption, wherein the target home appliance is infected with malware when the power consumption or the current consumption shows an active stable usage of power or current within a predetermined range when the target home appliance is in a stable state; and outputting a value indicating whether the target home appliance is infected with malware, the value being obtained by inputting the power consumption or the current consumption into the one model.

* * * * *